US008805300B2

(12) United States Patent  (10) Patent No.: US 8,805,300 B2
Alrabadi et al.  (45) Date of Patent: *Aug. 12, 2014

(54) AGILE AND ADAPTIVE WIDEBAND MIMO ANTENNA ISOLATION

(75) Inventors: Osama Nafeth Alrabadi, Aalborg (DK); Mikael Bergholz Knudsen, Gistrup (DK); Gert F. Pedersen, Storvorde (DK); Alexandru Daniel Tatomirescu, Aalborg (DK); Mauro Pelosi, Aalborg (DK); Samantha Caporal Del Barrio, Aalborg (DK); Poul Olesen, Stovring (DK); Peter Bundgaard, Aalborg (DK)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,683

(22) Filed: Aug. 30, 2012

(65) Prior Publication Data

US 2013/0244594 A1    Sep. 19, 2013

Related U.S. Application Data

(63) Continuation-in-part of application No. 13/423,613, filed on Mar. 19, 2012.

(51) Int. Cl.
*H04B 1/44*  (2006.01)

(52) U.S. Cl.
USPC ....... 455/78; 455/101; 455/67.16; 455/276.1; 455/66.1; 455/73; 343/700 MS; 343/702

(58) Field of Classification Search
USPC ........ 455/73, 101, 33, 66.1, 67.16, 276.1, 78; 343/702, 700 MS
See application file for complete search history.

(56) References Cited

U.S. PATENT DOCUMENTS

| 5,812,088 | A  | * | 9/1998  | Pi et al. ...................... 342/373 |
| 6,081,233 | A  |   | 6/2000  | Johannisson |
| 7,069,053 | B2 | * | 6/2006  | Johannisson et al. ...... 455/562.1 |
| 7,260,141 | B2 | * | 8/2007  | Bierly et al. .................. 375/222 |
| 7,657,243 | B2 | * | 2/2010  | Yoon et al. ................. 455/276.1 |
| 7,817,967 | B2 | * | 10/2010 | Karabinis et al. ............ 455/101 |
| 8,233,554 | B2 | * | 7/2012  | Karabinis et al. ............ 375/260 |
| 8,233,846 | B2 | * | 7/2012  | Rofougaran .................. 455/73 |

(Continued)

OTHER PUBLICATIONS

Barry D. Van Veen, et al., "Beamforming: A Versatile Approach to Spatial Filtering", IEEE ASSP Magazine, Apr. 1988, p. 4-24.

(Continued)

*Primary Examiner* — Marceau Milord
(74) *Attorney, Agent, or Firm* — Eschweiler & Associates, LLC

(57) ABSTRACT

The disclosed invention relates to a MIMO (multiple input, multiple output) wideband transceiver. In some cases, the MIMO wideband transceiver comprises a signal processor that outputs or receives a plurality of distinguishable data streams. A first data stream is provided to a first antenna port connected to a plurality of wideband antennas, while a second data stream is provided to a second antenna port connected to a wideband antenna. A spatial filter element configured to assign antenna weights to the plurality of wideband antennas, which cause the wideband antennas to operate in a manner that attenuates wireless signals, at a frequency range at which the wideband transmit wideband radiate, in the direction of the wideband antenna without attenuating the wireless signals in other directions. By attenuating signals extending between the plurality of wideband antennas and the wideband antenna, wideband decoupling between first and second antenna ports is achieved.

19 Claims, 12 Drawing Sheets

(56) References Cited

U.S. PATENT DOCUMENTS

| | | | |
|---|---|---|---|
| 8,238,318 B1* | 8/2012 | Negus | 370/338 |
| 8,259,830 B1* | 9/2012 | McCloskey et al. | 375/260 |
| 8,412,126 B2* | 4/2013 | Karabinis et al. | 455/101 |
| 8,423,028 B2* | 4/2013 | Kenington et al. | 455/445 |
| 8,433,242 B2* | 4/2013 | Kenington et al. | 455/25 |
| 2007/0201575 A1 | 8/2007 | Ariyavisitakul et al. | |
| 2009/0191876 A1 | 7/2009 | Jain et al. | |
| 2010/0045553 A1 | 2/2010 | Ohira et al. | |

OTHER PUBLICATIONS

M. Pelosi, et al., "A Novel Paradigm for High Isolation in Multiple Antenna Systems with User's Influence", European Conference on Antennas and Propagation 2010, Apr. 12-16, 2010, Barcelona, p. 1-5.

Mauro Pelosi, et al., "Multiple Antenna Systems with Inherently Decoupled Radiators", IEEE Transactions on Antennas and Propagation, vol. 60, No. 2, Feb. 2012, p. 503-515.

U.S. Appl. No. 13/423,613, filed Mar. 19, 2012. 31 pages.

Dave Borison, et al. "MIMO's multi-dimensional approach multiplies capacity." Jun. 7, 2005. Retrieved from http://www.eetimes.com/General/PrintView/4012570.

Non-Final Office Action dated Dec. 5, 2013 for U.S. Appl. No. 13/423,613. 26 Pages.

Office Action Dated Apr. 16, 2014 U.S. Appl. No. 13/423,613.

* cited by examiner

US 8,805,300 B2

AGILE AND ADAPTIVE WIDEBAND MIMO ANTENNA ISOLATION

RELATED APPLICATION

This application is a continuation-in-part of U.S. application Ser. No. 13/423,613 filed Mar. 19, 2012, entitled "AGILE AND ADAPTIVE TRANSMITTER-RECEIVER ISOLATION."

BACKGROUND

Many modern wireless communication devices (e.g., cell phones, wireless sensors, PDAs, RFID readers, etc.) utilize transceivers having both a transmitter section configured to transmit data and a receiver section configured to receive data over radio frequencies.

For example, FIG. 1 illustrates a wireless communication transceiver 100 comprising a transmission path 102 and a reception path 104. To achieve high data rates, transceiver 100 may be configured to operate in full-duplex mode, wherein both transmission path 102 and reception path 104 operate at the same time. During full-duplex mode operation, transmission path 102 typically uses one carrier frequency while reception path 104 uses another carrier frequency (e.g., an adjacent frequency band). In order to provide isolation between transmission path 102 and reception path 104, a duplexer 106 may couple both transmission path 102 and reception path 104 to a common antenna 108.

Despite using different frequencies, intermodulation distortion may arise during operation of transceiver 100. One of the most common sources of intermodulation distortion occurs when a transmitted signal 110 leaks into reception path 104 due to limited isolation between transmission path 102 and reception path 104. Once intermodulation distortion appears within reception path 104, there is no way of distinguishing it from the desired signal and transceiver sensitivity is degraded.

DETAILED DESCRIPTION

Figure 1:
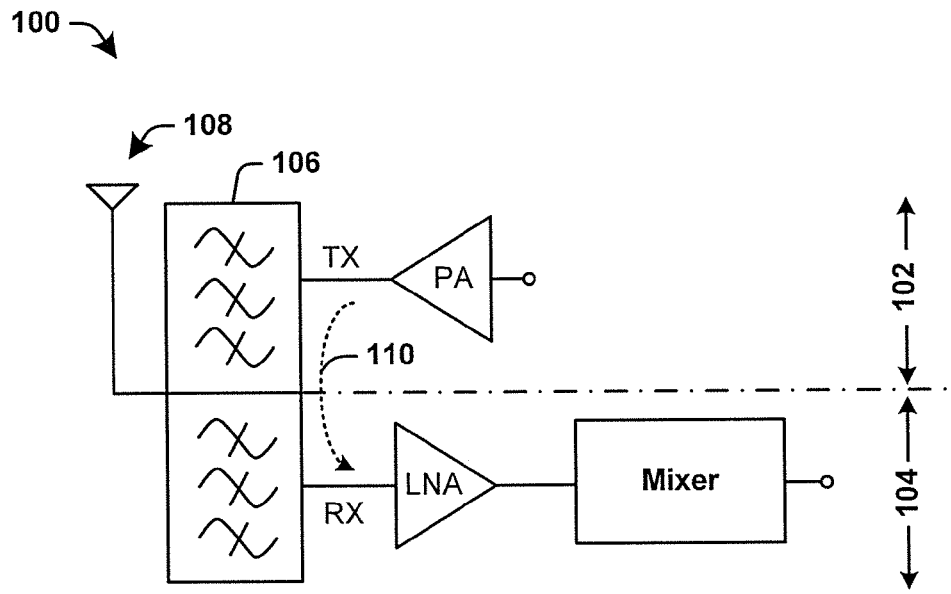
FIG. 1 illustrates a block diagram of a transceiver system with intermodulation distortion in the reception path.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Wireless communication devices are configured to wirelessly transmit and receive an RF signal by exciting one or more radiators (e.g., antennas) with the RF signal. To ensure that a signal is properly transmitted or received, a degree of isolation is present between the signal to be transmitted and other signals in the wireless communication system. Without such isolation, performance of the wireless communication system is degraded. For example, MIMO (multi-input multi-output) antenna arrays comprise a plurality of antennas configured to respectively convey separate data streams collectively corresponding to an overall data signal. Isolation between the plurality of antennas ensures that the separate data streams remain independent of one another. Without such isolation, one or more of the data streams may become distorted such that the overall data signal cannot be recovered by a receiver.

Figure 2:
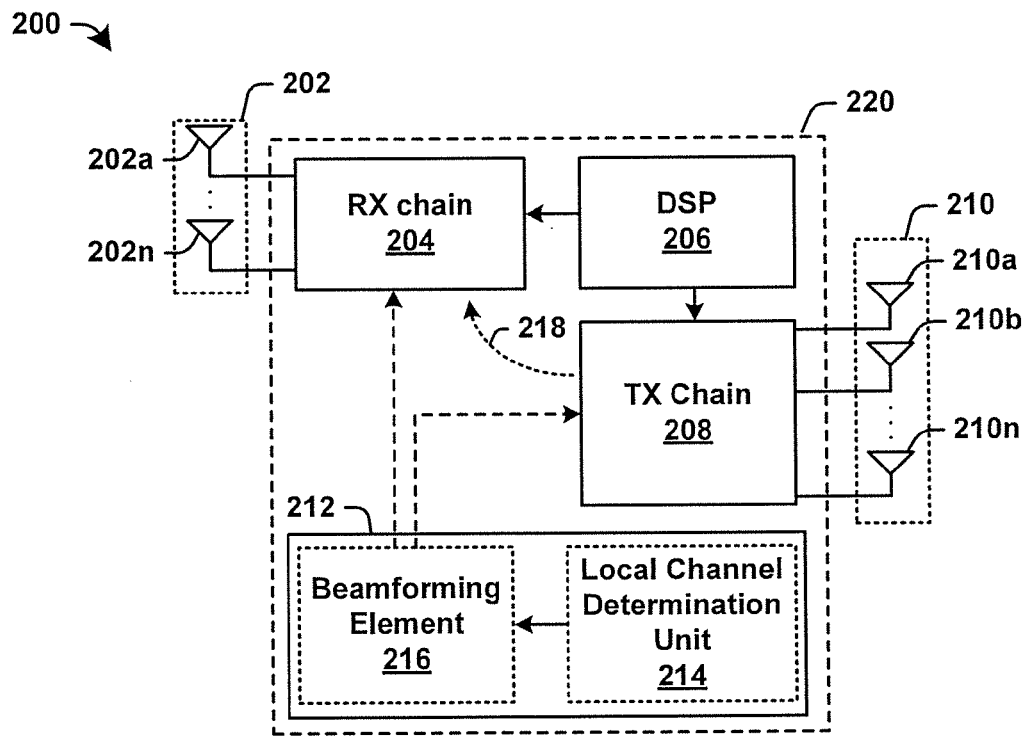
FIG. 2 illustrates an exemplary block diagram of a transceiver system configured to provide a high degree of transmitter-receiver isolation by attenuating local transmitted and/or received signals.

Accordingly, in some cases, a transceiver system is disclosed herein that utilizes a spatial filter to achieve a high degree of isolation between antennas of a MIMO antenna array. In some embodiments, the transceiver system comprises a signal processor that outputs or receives a plurality of distinguishable data streams. A first data stream is provided to a first antenna port connected to a plurality of wideband antennas, while a second data stream is provided to a second antenna port connected to a wideband antenna. A spatial filter element configured to assign antenna weights to the plurality of wideband antennas, which cause the wideband antennas to operate in a manner that attenuates wireless signals, at a frequency range at which the wideband transmit radiators radiate, in the direction of the wideband antenna without attenuating the wireless signals in other directions. By attenuating signals extending between the plurality of wideband antennas and the wideband antenna, wideband decoupling between first and second antenna ports is achieved. FIG. 2 illustrates an exemplary block diagram of a transceiver system 200 configured to provide a high degree of transmitter-receiver isolation by attenuating transmitted and/or received signals.

The transceiver system 200 comprises a mobile communication device 220 having a reception path and a transmission path. The reception path comprises a receive antenna array 202 comprising one or more receive antennas 202a-202n configured to receive a first RF signal (a received signal). The received signal is provided to a reception chain 204 configured to demodulate and down-convert the received signal. The down-converted, demodulated signal is provided to a digital signal processor (DSP) 206. The transmission path comprises transmission chain 208 configured to modulate data received from the DSP 206 onto a carrier wave and then to up-convert the modulated data from a baseband frequency to a radio frequency (RF), thereby generating a second RF signal. The second RF signal is provided to a transmit antenna array 210 comprising a plurality of transmit antennas 210a-210n, which are configured to wirelessly transmit the second RF signal (a transmitted signal).

A spatial filter element 212 is configured to operate the transmit and/or receive antennas in a manner that attenuates RF signals directed between local antennas comprised within the same mobile communication device 220 (i.e., signals transmitted from a transmit antenna array 210 and received by a receiver antenna array 202). In particular, the spatial filter element 212 operates the transmit/receive antennas in a manner that attenuates transmitted/received RF signals over a null angle that is in the direction of the receive/transmit antennas. By attenuating RF signals directed between local antennas a high degree of isolation is achieved between the transmission path and the reception path.

For example, in some embodiments, the spatial filter element 212 is configured to operate the plurality transmit antennas 210a-210n in a manner that attenuates transmitted signals over a null angle that is in the direction of the local receive antennas 202a-202n (i.e., to attenuate signals transmitted to receive antennas comprised within the same mobile communication device 220 as transmit antennas 210a-210n) without attenuating the transmitted signals over other angles. In other embodiments, the spatial filter element 212 is configured to operate the plurality of receive antennas 202a-202n in a manner that attenuates received signals over a null angle that is in the direction of a local transmit antennas 210a-210n (i.e., to attenuate signals received from transmit antennas comprised within the same mobile communication device 220 as receive antennas 202a-202n) without attenuating the received signals over other angles. By attenuating transmitted signals in the direction of the receive antennas 202a-202n or received signals in the direction of the transmit antennas 210a-210n, a high degree of isolation is achieved between transmission and reception paths.

In some embodiments, the spatial filter element 212 comprises a local channel determination unit 214 and a beamforming element 216. The local channel determination unit 214 is configured to determine an environment of local communication channels 218 extending between the transmission path and the reception path. In other words, the local channel determination unit 214 determines an effect of transmitted signals on a receive antenna 202. In some embodiments, the local channel determination unit 214 may comprise a memory element configured to store data (e.g., programmed by the DSP) corresponding to a static environment of local communication channels 218. In other embodiments, the local channel determination unit 214 may be configured to actively monitor the environment of local communication channels between the transmission path and the reception path. For example, in some embodiments, the local channel determination unit 214 is configured to actively measure local communication channels 218 within the transceiver system 200 (e.g., using one or more sensors). In other embodiments, the local channel determination unit 214 is configured to detect an amount of a transmitted signal that has leaked into the reception path.

The local channel determination unit 214 provides data corresponding to an environment of local communication channels 218 to the beamforming element 216. The beamforming element 216 is configured to enable beamforming functionality within the transmit antenna array 210 and/or the receive antenna array 202 by applying antenna weights to the transmit and/or receive antennas. For example, the beamforming element 216 enables beamforming functionality for transmitted signals by weighing the transmit antennas 210a-210n with transmit antenna weights in a manner that causes the transmit antennas 210a-210n to attenuate the transmitted signal in the direction of the receive antenna 202.

The beamforming element 216 may weigh the receive antennas 202a-202n with analog complex weights to achieve a response of the received signal that has a reduced amplitude (e.g., a null) in the direction of the transmit antennas 210a-210n. For example, the beamforming element 216 can apply analog weights to the receive antennas 202a-202n by way of phase-shifters, and then combine the phase shifted signals before the received signal moves to a downstream LNA. By determining the receive antenna weights based upon the local communication channel environments, the amplitude of a received signal can be reduce over one or more null angles in the direction of local transmit antennas.

Similarly, the beamforming element 216 may weigh the transmit antennas 210a-210n with digital baseband complex weights (i.e., introducing transmit antenna weights in the baseband section of the transmission path) or analog complex weights (e.g., using variable vector modulators in the RF section of the transmission path) to achieve a response of the transmitted signal that has a reduced amplitude (e.g., a null) in the direction of the receive antennas 202a-202n.

For example, in some embodiments, the beamforming element 216 weighs transmit antennas 210a-210n by introducing a phase and/or amplitude shift into a transmitted signal provided to each of the transmit antennas 210a-210n. Concurrently providing transmitted signals with specific phases and/or amplitudes to the plurality of transmit antennas 210a-210n causes the transmitted signals to be superimposed upon one another to constructively interfere in some locations and to destructively interfere in other locations. By determining the transmit antenna weights based upon the local communication channel environments, the interference can be set to result in a transmitted signal that is output according to a specific radiation pattern having a reduced amplitude over one or more null angles in the direction of local receive antennas.

Since the disclosed spatial filter element 212 is configured to provide for isolation by attenuating the transmitted/received signal in the direction of the receive antennas 202a-202n/transmit antennas 210a-210n, a high degree of isolation can be achieved even if the frequencies of the receive antennas 202a-202n and transmit antennas 210a-210n overlap one another. Therefore, in some embodiments, the receive antennas 202a-202n and the transmit antennas 210a-210n may comprise wideband antennas.

In some embodiments, the beamforming element 216 is configured to dynamically vary the antenna weights. By dynamically varying the antenna weights (e.g., the phases and/or amplitudes of the transmitted signals) changes in the local communication channels 218 can be accounted for and/or the direction and/or size of a null angle can be adjusted. For example, if the phases of the RF signal transmitted from antennas 210a-210n are the same, the resulting transmitted signal will have a first null angle, while if the phases of the RF signal transmitted from antennas 210a-210n are different, the resulting transmitted signal may be steered to have a second null angle.

It will be appreciated that the proposed method and apparatus are not limited to providing isolation between a transmission path and reception path in an FDD mode of operation. Rather the proposed method and apparatus can provide isolation in many different situations. For example, the proposed method and apparatus can provide isolation between a transmission path that belongs to a first wireless communication standard (e.g., WiFi TX) and a reception path that belongs to another second wireless communication standard (e.g., a Bluetooth Rx) when both the transmission path and reception path are collocated in a same handset.

To enhance the readers understanding of the disclosed methods and apparatus, FIGS. 3A-5 are described in regards to operating transmit antennas in a manner that attenuates a transmitted signal to form a null angle comprising one or more receive antennas. However, one of ordinary skill in the art will appreciate that the disclosed method and apparatus are not limited to such cases, but may be alternatively applied to operating receive antennas in a manner that attenuates a received signal to form a null angle comprising one or more transmit antennas.

Figure 3A:
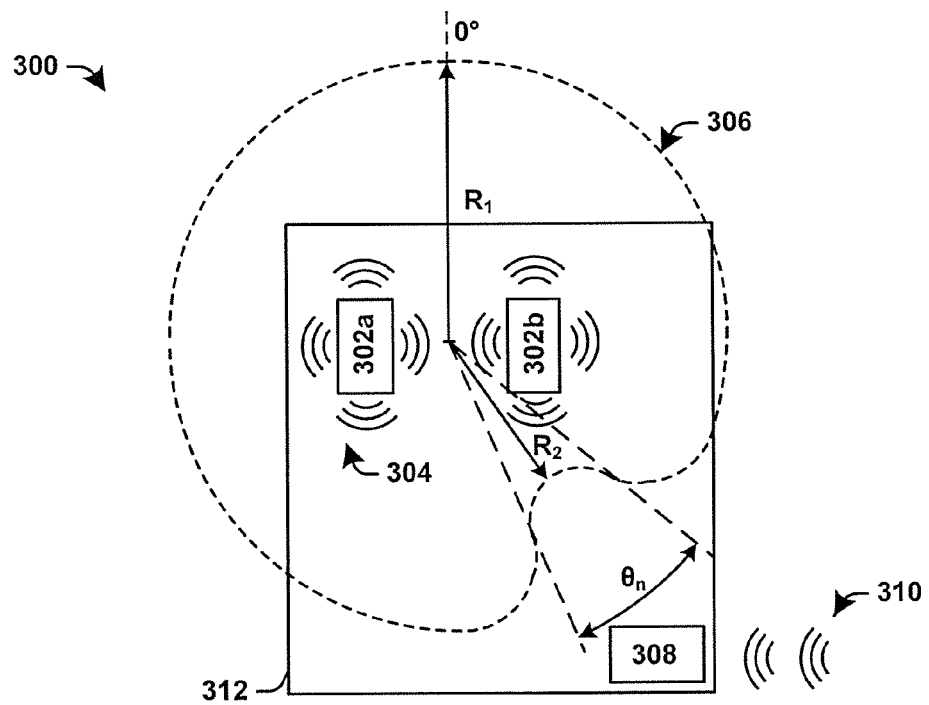
FIG. 3A illustrates an exemplary block diagram of a top view of a transceiver system having a plurality of transmit antennas configured to provide a high degree of transmitter-receiver isolation by attenuating transmitted signals directed towards one or more receive antennas.

FIG. 3A illustrates an exemplary block diagram of a top view of a transceiver system 300 having a plurality of transmit antennas configured to provide a high degree of transmitter-receiver isolation by reducing an amplitude of transmitted signals in the direction of one or more receive antennas.

The transceiver system 300 comprises a mobile communication device 312 having transmit antennas 302a-302b and a receive antenna 308. The transmit antennas 302a-302b are configured to transmit first RF signals (transmitted signals 304), while the receive antenna 308 is configured to receive second RF signals (received signals 310). The transmitted signals 304 interfere with one another to collectively form a radiation pattern 306 over which the transmitted signals 304 are transmitted. By properly weighting the transmit antennas 302a-302b with proper transmit antenna weights (e.g., baseband complex weights or analogue complex weights) the transmitted signals 304 output by the transmit antennas 302a-302b destructively interfere so as to jointly zero-force the near-field over a null angle $\theta_n$ that is in the direction of the receive antenna 308.

For example, transmitted signals 304 from transmit antennas 302a-302b constructively interfere with one another to form a radiation pattern 306 that maintains a given amplitude until a radius $R_1$, which extends from a center point of the transmit antennas 302a-302b. However, along the null angle $\theta_n$ the transmitted signals 304 destructively interfere with one another to from a radiation pattern 306 that maintains the given amplitude until a radius $R_2$ that is less than the radius $R_1$.

Figure 3B:
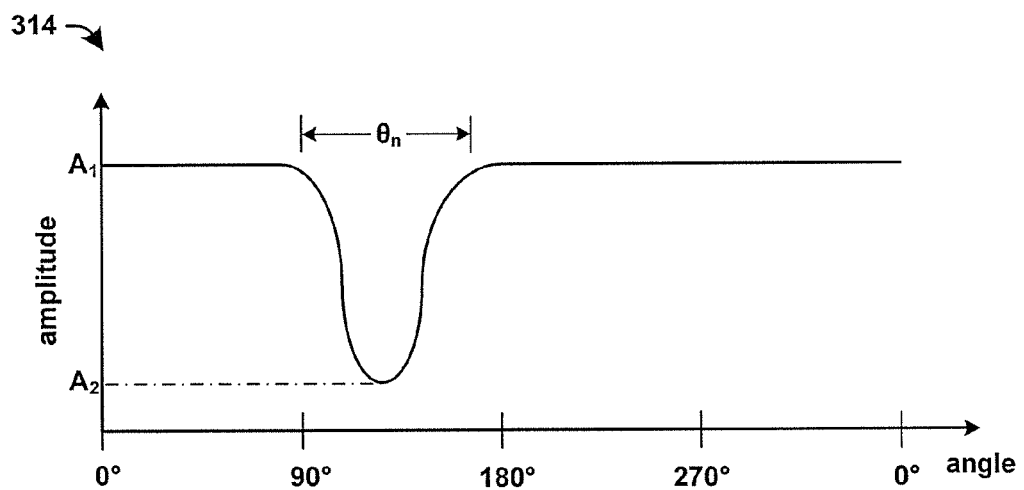
FIG. 3B is a graph showing a transmitted signal amplitude as a function of angle.

In other words, the power of the transmitted signals 304 are reduced over the null angle $\theta_n$ relative to the power of the transmitted signals 304 in other directions. For example, FIG. 3B is a graph 314 showing a transmitted signal amplitude as a function of angle, at a radius $R_1$. As shown in graph 314, the amplitude of the transmitted signal is reduced along the null angle $\theta_n$ with respect to the amplitude of the transmitted signal at other angles. Because the strength of the radiation pattern is reduced along the direction of the null angle $\theta_n$, a high degree of isolation between the transmit antennas and receive antennas is achieved.

While a mobile communication device 312 having two transmit antennas 302a and 302b can be operated to achieve a single null angle $\theta_n$, it will be appreciated that as the number of transmit antennas present within a transceiver system increases the number of null angles that can be achieved also increases. Therefore, in some embodiments, the number of transmit antennas is greater (e.g., by at least one) than the number of receive antennas, so that the transmit antennas can generate a null angles for receive antennas located at discrete angles.

Figure 3C:
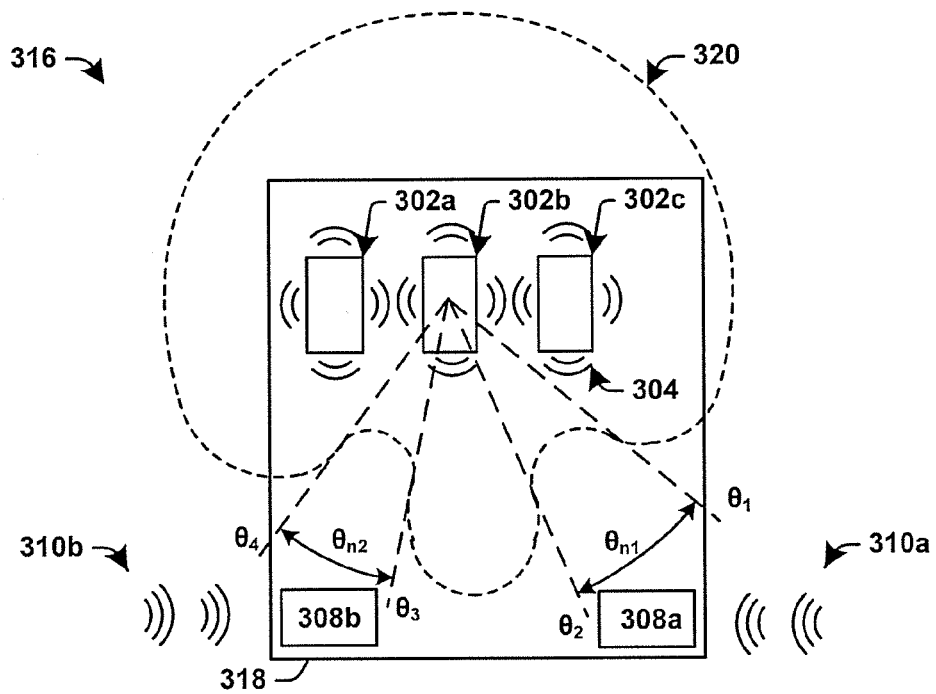
FIG. 3C illustrates an exemplary block diagram of a top view of a transceiver system having a plurality of transmit antennas configured to reduce an amplitude of transmitted signals along separate null angles.

For example, FIG. 3C illustrates an exemplary block diagram of a top view of a transceiver system 316 having a plurality of transmit antennas 302a-302c configured to reduce an amplitude of transmitted signals along separate null angles $\theta_{n1}$-$\theta_{n2}$. In particular, the transceiver system 316 comprises a mobile communication device 318 having three transmit antennas 302a-302c and two receive antennas 308a-308b. The three transmit antennas 302a-302c allow the mobile communication device 318 to be operated to generate a radiation pattern 320 having a first null angle $\theta_{n1}$ extending from $\theta_1$ to $\theta_2$ and a second null angle $\theta_{n2}$ extending from $\theta_3$ to $\theta_4$. The different null angles $\theta_{n1}$ and $\theta_{n2}$ reduce an amplitude of transmitted signals in the directions of two receive antennas, 308a and 308b, which are located at discrete angles.

Figure 4:
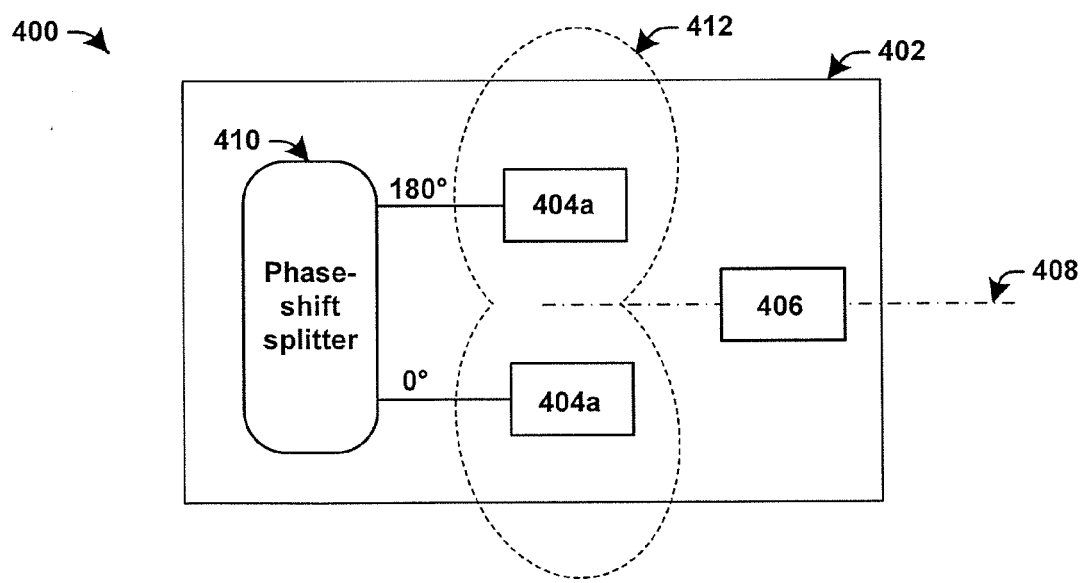
FIG. 4 illustrates a top view of a transceiver system having a symmetric transmit antenna topology configured to attenuate transmitted signals towards one or more receive antennas.
Figure 5A:
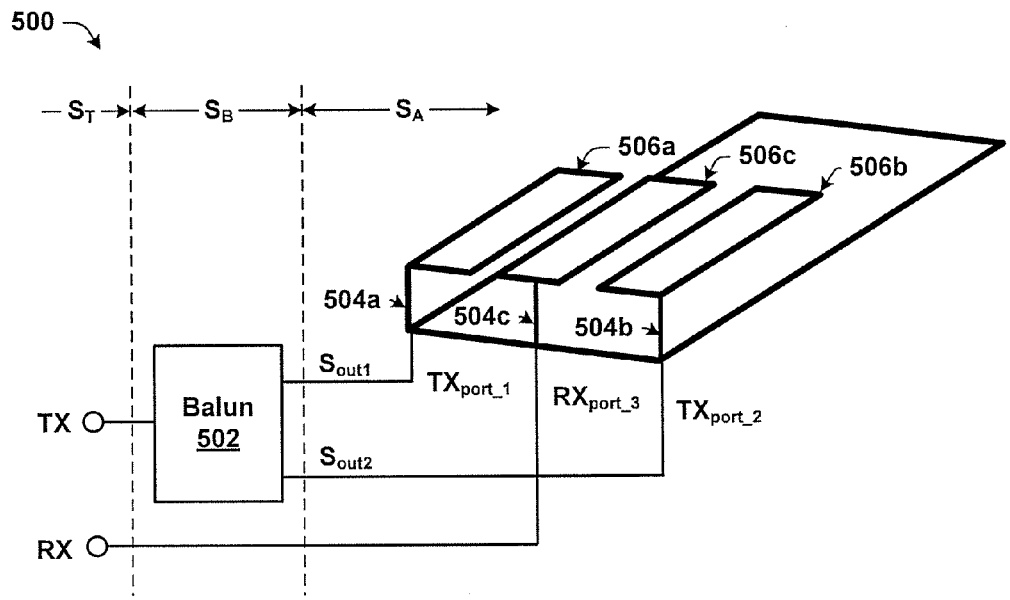
FIG. 5A illustrates a three dimensional embodiment of a transceiver system having a symmetric transceiver array topology implemented using PIFA antennas.
Figure 5B:
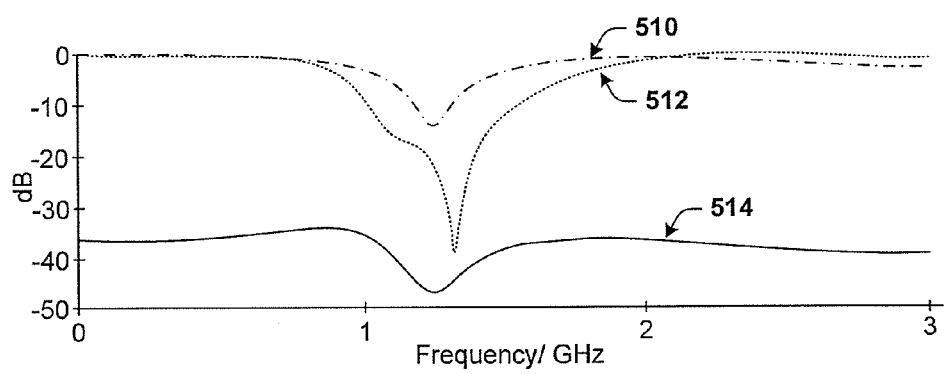
FIG. 5B illustrates a graph showing a frequency response of the transceiver system shown in FIG. 5A.

FIGS. 4 and 5A-5B illustrate a specific embodiment of a transceiver system having transmit antennas configured to attenuate transmitted signals towards a receive antennas. The transceiver system comprises an environment where there is no or limited user interaction with the wireless device, allowing for the transmit antenna weights to be constant (e.g., to be programmed by the DSP or designed once using fixed phase-shifts and fixed gains). It will be appreciated that the transceiver system in FIGS. 4 and 5A-5B is not limited to the number of transmit and receive antennas shown.

FIG. 4 illustrates a top view of a more detailed example of a transceiver system 400 having a transmit antenna array configured to attenuate transmitted signals towards one or more receive antennas.

The transceiver system 400 comprises a mobile communication device 402 comprising a first transmit antenna 404a and a second transmit antenna 404b configured to radially transmit an RF signal. A receive antenna 406 is located along an axis of symmetry 408 of first and second transmit antennas 404a and 404b. In alternative embodiments, more than one receive antenna can be located along the axis of symmetric and receive similar strong isolation levels.

A phase-shift splitter 410 is configured to provide a first signal to first transmit antenna 404a and a second signal to second transmit antenna 404b. The first and second signals are equal but antipodal versions of the same signal. For example, the first signal may be 180° phase-shifted version of the second signal. In some embodiments, the phase-shift splitter 410 may comprise a balun configured to receive single ended signal and to output differential signals having a 180° phase shift therebetween. In various other embodiments, the phase-shift splitter may comprise a power divider together with a 180° phase-shifter or other circuitry that provides a similar functionality. By providing transmit antennas 404a and 404b with antipodal version of the same signal the local communication channels output from the transmit antennas 404a, 404b form a transmitted signal having a null vector along the axis of symmetry 408, which corresponds to the location of the receive antenna 406.

FIG. 5A illustrates an embodiment of a disclosed transceiver system 500 implemented using a three port antenna array comprising PIFA antennas. Transceiver system 500 is a non-limiting embodiment of a disclosed transceiver system, and one of ordinary skill in the art will appreciate that the transmit and receive antennas may comprise various types of antennas. In some embodiments, the transmit and receive antennas may comprise planar inverted-F wideband antennas (PIFA) and/or multiple-input/multiple-output (MIMO) wideband antennas. In some embodiment, the transmit antennas may comprise MIMO wideband antennas and the receive antenna may comprise a wideband PIFA, for example.

Transceiver system 500 comprises a transmit channel TX and a receive channel RX. The transmit channel TX is connected to a first antenna port $TX_{port\_1}$ and a third antenna port $TX_{port\_3}$ by way of a balun 502. The balun 502 is configured to receive a signal to be transmitted from the transmit channel TX and to generate first and second output signals, $S_{out1}$ and $S_{out2}$, having a phase-shift therebetween. The first and second output signals, $S_{out1}$ and $S_{out2}$, are provided to the first antenna port $TX_{port\_1}$ and the third antenna port $TX_{port\_3}$, respectively. In some embodiments, the first output signal $S_{out1}$ may have a 180° phase shift with respect to the second output signal $S_{out2}$. The receive channel RX is connected to a second antenna port $RX_{port\_2}$.

The antenna ports are connected to three PIFA antennas 506a-506c by way of antenna feeds 504a-504c. In particular, the first and third antenna ports $TX_{port\_1}$, $TX_{port\_3}$ are connected to the first and third PIFA antennas 506a and 506c, while the second antenna port $RX_{port\_2}$ is connected to the second PIFA antenna 506b. The first and third PIFA antennas 506a and 506c are configured to operate as transmit antennas, while the second PIFA antenna 506b is configured to operate as a receive antenna located in a symmetric topology with respect to the two transmit antennas 506a and 506c.

The symmetric topology of the PIFA antennas allows for out of phase transmit signals to be provided to transmit antennas 506a and 506c in a manner that forms a transmitted signal having a reduced amplitude at receive antenna 506b. For example, in some embodiments the first and third antenna ports, $TX_{port1}$ and $TX_{port3}$, can be driven with a 180° out-of-phase signal by using baseband DSP weights of [0.707-0.707] to enable beamforming. In such an example, strong isolation is achieved between the transmit antennas 506a, 506c and the receive antenna 506b due to the deep null in the near-fields.

FIG. 5B illustrates a graph 508 showing a frequency response of the antenna array shown in FIG. 5A.

In particular, graph 508 shows signal responses for a reception path 510, a transmission path 512, and an isolation 514 between the transmission and reception paths at 1.3 GHz. The non-zero response of the reception path 510 and the transmission path 512 show that the transmission and reception paths are operating properly (i.e., receiving and radiating at 1.3 GHz), while the isolation 514 shows that there is isolation between them. Accordingly, the operational bandwidth of the reception paths 510 and transmission path 512 are not traded for isolation.

The results shown in graph 508 can be illustrated mathematically by defining a scattering matrix $S_A$ corresponding to the transmit and receive channels (See, FIG. 5A) and a matrix $S_B$, which represents the power division and phase shift operation.

$$S_A = \begin{bmatrix} S_{11} & S_{12} & S_{12} \\ S_{12} & S_{22} & S_{23} \\ S_{12} & S_{23} & S_{22} \end{bmatrix} \quad S_B = \begin{bmatrix} 1 & 0 \\ 0 & 1/\sqrt{2} \\ 0 & -1/\sqrt{2} \end{bmatrix}.$$

Cascading $S_A$ with $S_B$ results in a coupling free 2×2 matrix $S_T$, $$S_T = S_B^T S_A S_B$$
$$= \begin{bmatrix} S_{11} & 0 \\ 0 & S_{22} - S_{23} \end{bmatrix},$$

wherein the zeros along the diagonals indicate an isolation between the reception path and the transmission path.

It will be appreciated that in practice integrated antennas are sensitive to external use cases where there is user interaction with the wireless device (e.g., whether a hand is positioned on the phone, the position of a hand on the phone, etc.). Such external use cases alter the impedance of the integrated antenna, thereby altering the local communication channels between transmission and reception paths. Therefore, in environments having external influences, transmit antenna weights may vary in time to account for dynamic local communication channels.

Figure 6A:
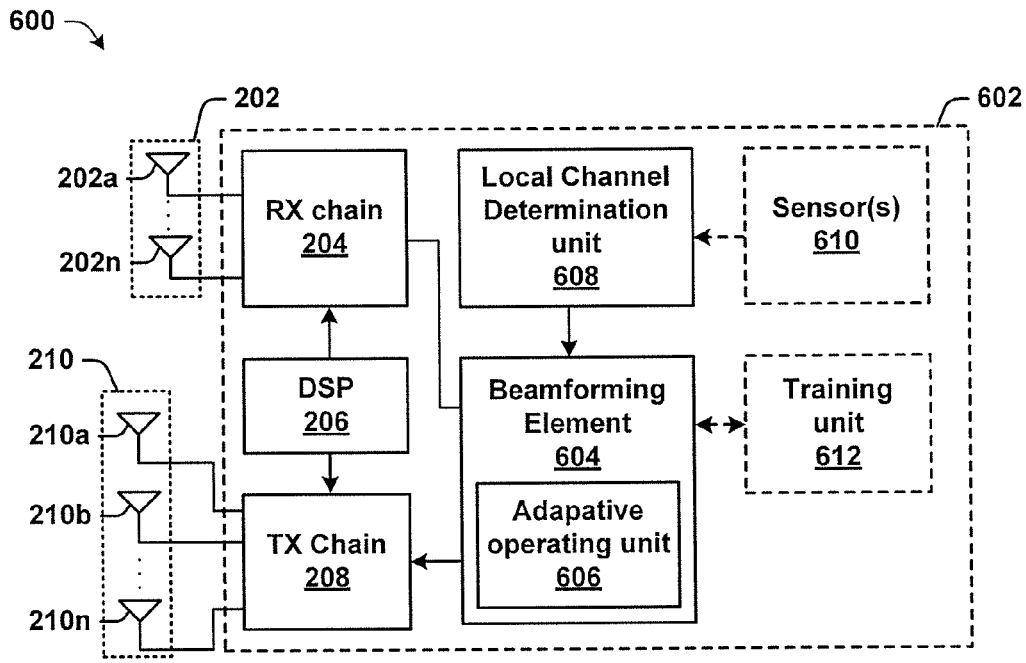
FIG. 6A illustrates a block diagram of a transceiver system configured to dynamically adapt transmit antenna weights.

FIG. 6A illustrates a disclosed transceiver system 600 configured to dynamically adapt antenna weights to account for changes in local communication channels between a reception path and a transmission path.

Transceiver system 600 comprises a mobile communication device 602 having a beamforming element 604 configured to apply transmit antenna weights to RF signals provided to different transmit antennas 210 and/or receive antenna weights to RF signals received at different receive antennas 202. The beamforming element 604 comprises an adaptive operating unit 606 configured to vary the transmit antenna weights that are applied by the beamforming element 604 in real time. In some embodiments weighting of the antennas is performed periodically according to the coherence time of the local communication channels. For example, if there is no or limited user proximity effect, the isolation can be made once at the design stage (e.g., as in wireless sensor transceivers), but if the local communication channels are time-varying due to user interaction and other proximity effects, vary the transmit antenna weights is performed periodically.

By dynamically adjusting the antenna weights, the adaptive operating unit 606 can account for changes in the local communication channels (e.g., due to external use cases) or to steer the null angle of transmitted and/or received signals. For example, at a first time period a first transmit antenna 210a outputs a signal having an amplitude $A_{1,1}$ and a phase a $\phi_{1,1}$, and a second transmit antenna 210b outputs a signal having an amplitude of $A_{2,1}$ and a phase $\phi_{2,1}$, resulting in a transmitted signal having a null angle $\phi_1$. At a second time period a change in external use cases causes the local communication channels to change. By adjusting the first transmit antenna 210a to output a signal having an amplitude $A_{1,2}$ and a phase $\phi_{1,2}$ and the second transmit antenna 210b to output a signal having an amplitude $A_{3,2}$ and a phase $\phi_{3,2}$ the null angle $\phi_1$ can remain the same despite changes in the local communication channels.

It will be appreciated that changes to the receive antenna weights can be implemented by the beamforming element 604 in analog (e.g., by phase shifters), while changes to the transmit antenna weights can be implemented by the beamforming element 604 either digitally or in analog. In some embodiments, changes in the transmit antenna weights can be implemented in analog by using vector modulators in an RF stage of the transmit chain 208. The vector modulators are configured to vary the amplitude and/or phase of the RF signal provided to transmit antennas 210a-210n. In other embodiments, changes in the transmit antenna weights can be implemented in digital by using an algorithm (e.g., zero forcing algorithm, SVD algorithm) that gives an excitation of transmit antennas 210a-210n that generates a null in the direction of a receive antenna 202. For example, the adaptive operating unit 606 may use a zero forcing algorithm to invert a measured local communication channel to achieve a null in the direction of a receive antenna 202.

In yet other embodiments, changes in the transmit antenna weights can be implemented through parasitic antennas attached to tunable reactive loads. For example, in some embodiments transmit antennas 210a-210n are connected to one or more parasitic elements having a reactance value associated therewith. Feed circuits are configured to feed signals having different phases to the transmit antennas 210a-210n. By changing the reactance values associated with the parasitic elements, electrical lengths of the parasitic elements can be changed, causing the transmitted signal to change its direction.

In some embodiments, the adaptive operating unit 606 is configured to determine the transmit and/or receive antenna weights using an iterative algorithm to change transmit and/or receive antenna weights until a local channel determination unit 608 detects that a null is achieved towards a receive antenna 202 and/or a transmit antenna. For example, the adaptive operating unit 606 can use an algorithm that converges blindly without knowing the local communication channels by changing transmit antenna weights applied to transmit antennas and by detecting a power of the transmitted signal (via local channel determination unit 608) at a receive antenna, until a minimum energy of the transmitted signal is achieved.

Alternatively, the adaptive operating unit 606 can receive data about local communication channels from the local channel determination unit 608 and determine transmit and/or receive antenna weights therefrom. For example, in some embodiments, the adaptive operating unit 606 is configured to adaptively change transmit antenna weights based upon the detected changes in the local communication channels (i.e., the transmitted signals between transmit and receive antennas). In some embodiments, one or more sensors 610 located within the mobile communication device 602 are configured to measure data corresponding to the local communication channels (e.g., including changes in the local communication channels due to the presence or absence of external use cases) and to provide the data to the local channel determination unit 608.

In some embodiments, the transceiver system 600 comprises a training unit 612 configured to account for the dynamic changes in local communication channels by performing a local training sequence to determine transmit and/or receive antenna weights. In some embodiments, the training unit 612 is configured to perform a local training sequence to determine the local communication channels extending between the transmitter chain 208 and the receiver chain 204. The local communication channels are then provided to the beamforming element 604, which can invert the local communication channels to get null towards receive antenna 202.

Figure 6B:
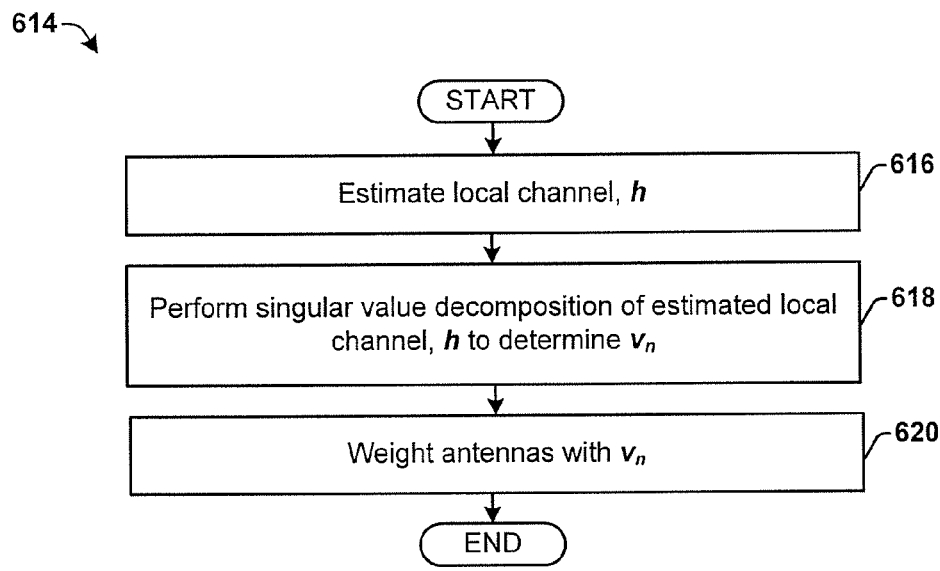
FIG. 6B is a flow diagram of an exemplary local training sequence that may be implemented to account for changes in local communication channels.

FIG. 6B illustrates a flow diagram 614 of an exemplary training sequence that may be implemented to account for the dynamic changes in the local communication channel.

It will be appreciated that while the methods disclosed herein (e.g., methods 614 and 1000) are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Furthermore, the disclosed methods may be implemented as a apparatus, or article of manufacture using standard programming and/or engineering techniques to produce software, firmware, hardware, or any combination thereof to control a computer to implement the disclosed subject matter (e.g., the circuits shown in FIG. 2, 6A, etc., are non-limiting examples of circuits that may be used to implement the disclosed methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 602, the method operates to determine an estimated channel matrix h.

At 604, a singular value decomposition of the estimated channel matrix h is taken. According to the singular value decomposition theorem, the singular value decomposition of the estimated channel matrix h gives $\Sigma V^H$ (i.e. $\zeta(h)=\Sigma V^H$), where $V=[v_s\ v_n]$ and $v_n$ is the vector that lies in the null space of h.

At 606, antennas are weighted with $v_n$ to attenuate signals directly between local receive and transmit antennas.

Although illustrated above in relation to narrow-band isolation between a transmission chain and a reception chain, it will be appreciated that the disclosed method of isolation is not limited to such narrow-band isolation between transmission and reception chains. For example, in some cases, the proposed isolation method and apparatus can be employed for achieving wideband decoupling within a wideband MIMO (Multiple-Input/Multiple-Output) antenna setup (e.g., instead of tunable narrow-band isolation between a transmitter and receiver). Such wideband decoupling provides isolation over a broad frequency band used by wideband radiators (i.e., antennas), so as to prevent a signal being provided to one port of a MIMO from interfering with a signal provided to another port of the MIMO.

Figure 7:
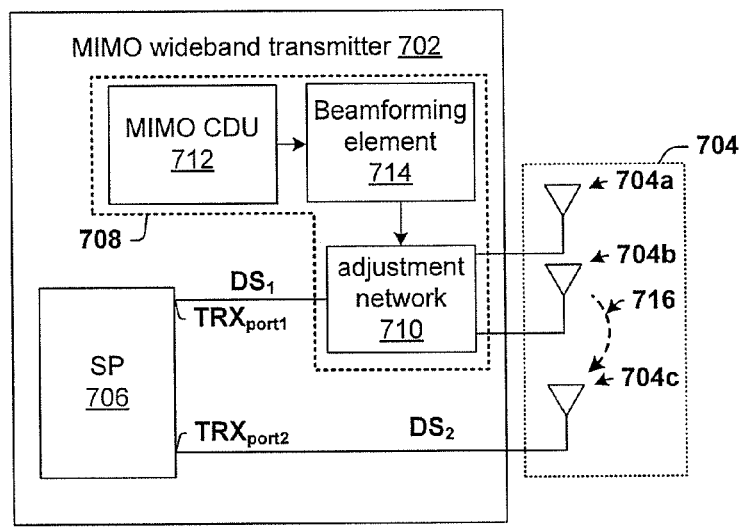
FIG. 7 illustrates a transmitter system comprising a spatial filter configured to provide wideband decoupling between antennas in a wideband MIMO setup.

For example, FIG. 7 illustrates a MIMO wideband transceiver system 700 comprising a spatial filter 708 configured to provide wideband decoupling between antennas in a wideband MIMO antenna array 704. In contrast to the narrow-band isolation between transmit and receive antennas, wideband MIMO performance can be enabled with a lower degree of port-to-port isolation. For example, instead of having isolation at a specific frequency (e.g., 50-60 dB over a 10 MHz frequency band), MIMO wideband transceiver system 700 is configured to have a lower average isolation over a wider band (e.g., 10-20 dB over a 20-300 MHz frequency band).

The MIMO wideband transceiver system 700 comprises a mobile communication device 702 having a signal processor 706 (e.g., a signal generator) that is connected to a MIMO antenna array 704 by way of first and second antenna ports, $TRX_{port1}$ and $TRX_{port2}$. In some embodiments, the signal processor 702 is configured to output a signal-to-be-transmitted as a plurality of distinguishable data streams. In other embodiments, the signal processor 702 is configured to receive a plurality of distinguishable data streams corresponding to a received signal. The MIMO antenna array 704 comprises a plurality of wideband antennas 704a, ..., 704c with substantially equal operating characteristics (e.g., gain, radiation pattern, etc.) over a wide range of frequencies (e.g., a frequency band over 20 MHz wide). In some cases, the plurality of wideband antennas 704a, ..., 704c are configured to separately transmit the distinguishable data streams from the mobile communication device 702 to a remote mobile terminal (not shown). In other cases, the plurality of wideband antennas 704a, ..., 704c are configured to separately receive distinguishable data streams from a remote mobile terminal (not shown).

The first antenna port $TRX_{port1}$ is connected to MIMO wideband antennas 704a and 704b by way of a spatial filter 708. The spatial filter 708 has an input node connected to the first antenna port $TRX_{port1}$ and output nodes connected to wideband antennas 704a and 704b. The second antenna port $TRX_{port2}$ is connected to wideband antenna 704c. During transmission, the first antenna port $TRX_{port1}$ is configured to convey a first data stream $DS_1$ between the signal processor 706 and wideband antennas 704a and 704b, while the second antenna port $TRX_{port2}$ is configured to convey a second data stream $DS_2$ between the signal processor 706 and wideband antenna 704c. The spatial filter 708 is configured to operate wideband antennas 704a and 704b in a manner that provide isolation between the antenna ports by operating wideband antennas 704a and 704b to perform beamforming that attenuates the first data stream $DS_1$ in a direction of wideband antenna 704c. By attenuating the first data stream $DS_1$ in the direction of wideband antenna 704c, a high degree of port-to-port isolation is achieved between antenna ports of the MIMO antenna array 704, thereby providing for wideband decoupling between the first and second antenna ports, $TRX_{port1}$ and $TRX_{port2}$.

In some embodiments, the spatial filter 708 further comprises a beamforming element 714 configured to operate an adjustment network 710 to introduce a phase shift and/or amplitude shift into the first data stream $DS_1$, so that the wideband antennas 704a and 704b receive phase and/or amplitude shifted versions of the first data stream $DS_1$. The phase and/or amplitude shift causes wireless signals output by wideband antennas 704a and 704b to interfere in a manner that provides for a shallow isolation over a wide frequency band in the direction of wideband antenna 704c. In some embodiments, the values of the phase shift and/or the amplitude shift are optimized so that the maximum or average leakage from $TRX_{port1}$ to $TRX_{port2}$ over an entire target band is minimized, thereby achieving wideband decoupling (instead of tunable narrow-band isolation) within the wideband MIMO setup. In various embodiments, the adjustment network 710 may comprise a network of phase shifters (e.g., digital or analog phase shifters) or a network of lossless components (e.g., inductors and capacitors) and/or shunt components.

In some embodiments, the spatial filter 708 comprises a MIMO channel determination unit 712. The MIMO channel determination unit 712 is configured to determine data corresponding to a leakage between the antenna ports $TRX_{port1}$ and $TRX_{port2}$. For example, in some embodiments, the MIMO channel determination unit 712 is configured to determine data corresponding to the leakage between antenna ports $TRX_{port1}$ and $TRX_{port2}$ by detecting an environment of communication channels 716 extending between antenna ports (e.g., by detecting an effect of one transmitted data stream on another transmitted data stream). The data corresponding to the leakage is provided to the beamforming element 714, which is configured to optimize the phase shift and/or amplitude shift introduced by the adjustment network 710 to attenuate the data stream output from wideband antennas 704a and 704b in the direction of wideband antenna 704c over a bandwidth at which the wideband antennas 704a and 704b radiate at (e.g., a 10-20 MHz bandwidth). In some embodiments, the MIMO channel determination unit 712 may be configured to actively monitor the environment of communication channels 716 extending between wideband antennas within the MIMO antenna array 704 (e.g., using one or more sensors).

The mobile communication device 702 may comprise an LTE-A mobile communication device. The LTE-A mobile communication device uses a wideband MIMO antenna array operate over a bandwidth of approximately 20 MHz. To provide for isolation in such a mobile communication device, the beamforming element 714 is operated to adjust the operating parameters of the adjustment network 710 to have values that provide for an isolation of 15-20 dB to be maintained over a 20 MHz bandwidth.

Figure 8A:
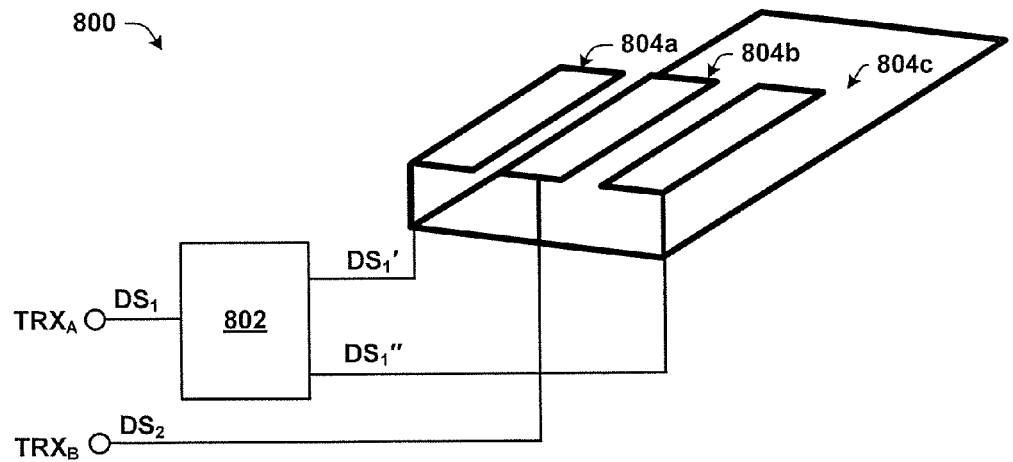
FIGS. 8A-8B illustrates a more particular example of a MIMO wideband transceiver system and an associated frequency response.

FIG. 8A illustrates an embodiment of a disclosed MIMO wideband transceiver system 800 implemented using a MIMO antenna array comprising a plurality of PIFA antennas. The wideband transceiver system 800 comprises a first antenna port $TRX_A$ and a second antenna port $TRX_B$. Although described below as transmit antenna ports (i.e., antenna ports configured to provide a signal to be transmitted to transmit antennas), one of ordinary skill in the art will appreciated that the first and second antenna ports, $TRX_A$ and $TRX_B$, may both comprise transmit antenna ports or may both comprise receive antenna ports.

The first antenna port $TRX_A$ is connected to first and third PIFA antennas 804a and 804c and is configured to provide a first data stream $DS_1$ to the first and third PIFA antennas, 804a and 804c. An adjustment network 802 (e.g., a balun) is located between the first antenna port $TRX_A$ and the first and third PIFA antennas, 804a and 804c. The adjustment network 802 is configured to introduce a phase shift and/or amplitude shift into a same version of the first data stream $DS_1$ to generate first and second adjusted data streams, $DS_1'$ and $DS_1''$, which are respectively provided to the first and third PIFA antennas, 804a and 804c. The second antenna port $TRX_B$ is connected to a second PIFA antenna 804b and is configured to provide a second data stream $DS_2$ to the second PIFA antenna 804b.

The first and third PIFA antennas 804a and 804c operate to transmit data stream $DS_1'$ and $DS_1''$, while the second PIFA antenna 804b is configured to operate to transmit data stream $DS_2$. The symmetric topology of the PIFA antennas 804a-804c allows for data streams $DS_1'$ and $DS_1''$, provided to PIFA antennas 804a and 804c, to form a transmitted signal having a reduced amplitude in the direction of PIFA antenna 804b, thereby achieving wideband isolation between PIFA antennas 804a, 804c and the PIFA antenna 804b.

Figure 8B:
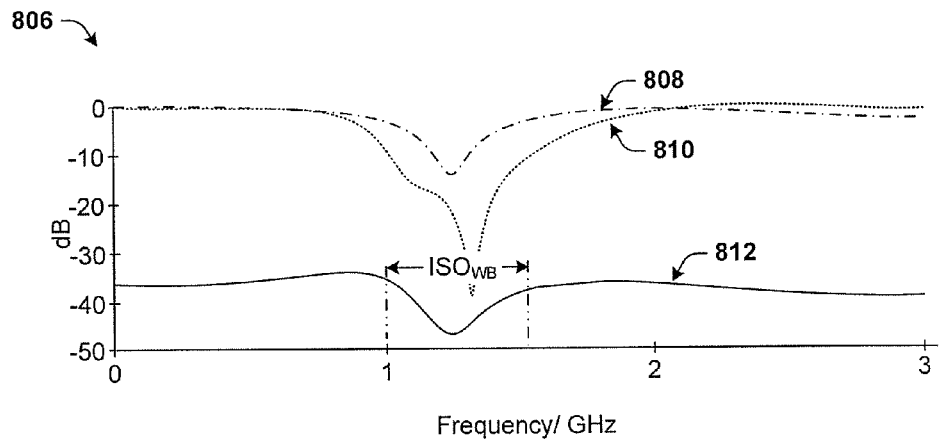

FIG. 8B illustrates a graph 806 showing the frequency response of a wideband MIMO setup having a first and second antenna port shown in FIG. 8A. The graph 806 illustrates the attenuation of signals between the first and second antenna ports (y-axis) as a function of frequency (x-axis).

Trend line 808 illustrates the reflected power that a signal processor (e.g., signal generator) is attempting to deliver to a second antenna by way of the second antenna port (e.g., S-parameter $_{S22}$ in a transmission matrix). Trendline 810 is the reflected power that the signal processor (e.g., signal generator) is attempting to deliver to first and third antennas by way of the first antenna port. Trendline 812 is the power transferred from a first antenna port to a second antenna port (e.g., S-parameter $_{S21}$ in a transmission matrix) for a transceiver system configured to provide for wideband decoupling between MIMO antenna ports.

As illustrated by trendline 812, the disclosed wideband decoupling between MIMO antenna ports provides for an isolation of 10-40 dB that spans a wide-spectrum band $ISO_{WB}$ of approximately 500 MHz, from approximately 1.0-1.5 GHz. Therefore, graph 800 illustrates that the disclosed wideband decoupling provides for a shallower isolation over a broader frequency band than the disclosed narrow-band isolation.

Figure 9:
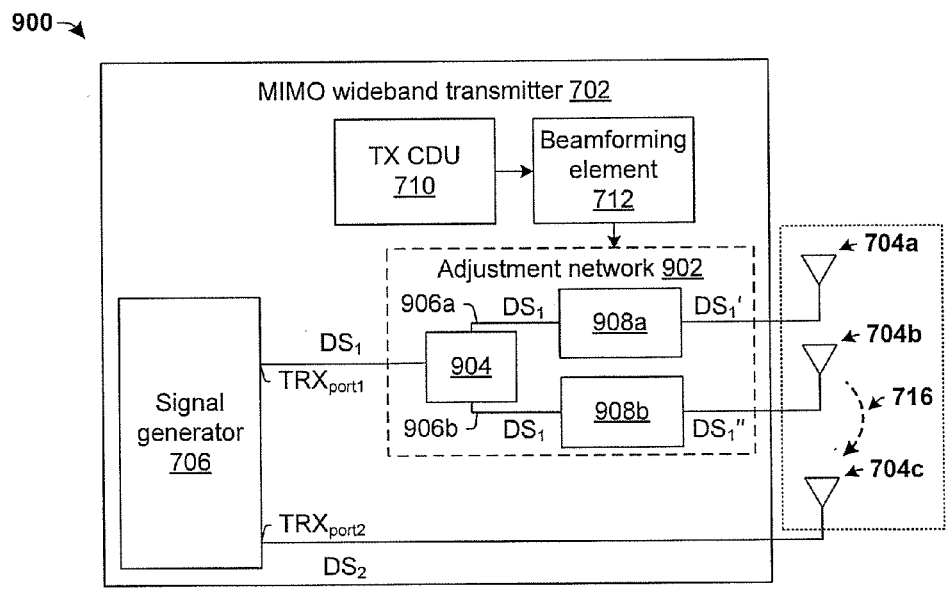
FIG. 9 illustrates an example of a lossless network comprised within a transmitter system configured to provide for wideband decoupling between antennas of a wideband MIMO.

FIG. 9 illustrates a more detailed example of a MIMO wideband transceiver system 900 comprising an adjustment network 902 comprising one or more circuit elements configured to introduce a phase shift or an amplitude shift into a data stream.

In some cases, the adjustment network 902 comprising a phase shift splitter having a splitter 904 configured to receive the first data stream $DS_1$ and to provide the first data stream $DS_1$ to a first path 906a and to a second path 906b. The first path 906a comprise a first phase shifter 908a configured to introduce a phase shift into the first data stream $DS_1$ so as to generate a first phase shifted version of the first data stream $DS_1'$. The first phase shifted version of the first data stream $DS_1'$ is provided to a first wideband antenna 704a. The second path 906b comprise a second phase shifter 908b configured to introduce a phase shift into the first data stream $DS_1$ so as to generate a second phase shifted version of the first data stream $DS_1''$. The second phase shifted version of the first data stream $DS_1''$ is provided to a second wideband antenna 704b.

In other cases, the adjustment network 902 may comprise a plurality of lossless components (e.g., inductors and capacitors) with some possible shunt components. The lossless components are configured to introduce a phase shift and/or amplitude shift into the first data stream to generate the first and second phase shifted version of the first data stream.

The beamforming element 712 is configured to optimize components values (corresponding to antenna weights) of the adjustment network 902 to minimize leakage between antenna ports $TRX_{port1}$ and $TRX_{port2}$. For example, in some embodiments, the beamforming element 712 is configured to optimize inductance/capacitance values in the adjustment network 902 so that the maximum (or average) leakage from the first antenna port $TRX_{port1}$ to the second antenna port $TRX_{port2}$ over a target frequency band is minimized, thereby achieving wideband decoupling (instead of tunable narrow-band isolation) within the wideband MIMO setup.

In some embodiments, the beamforming element 712 is configured to optimize components of the adjustment network 902 using an iterative algorithm to change component values until the MIMO channel determination unit 710 detects that a sufficient level of attenuation has been achieved between antennas 704 of the MIMO antenna array. For example, the beamforming element 712 can use an algorithm that converges blindly by changing component values (e.g., antenna weights) applied to antennas 704 and by detecting a power of the first data stream $DS_1$ at the second antenna port $TX_{port2}$, until a minimum energy of the first data stream $DS_1$ is achieved.

Figure 10:
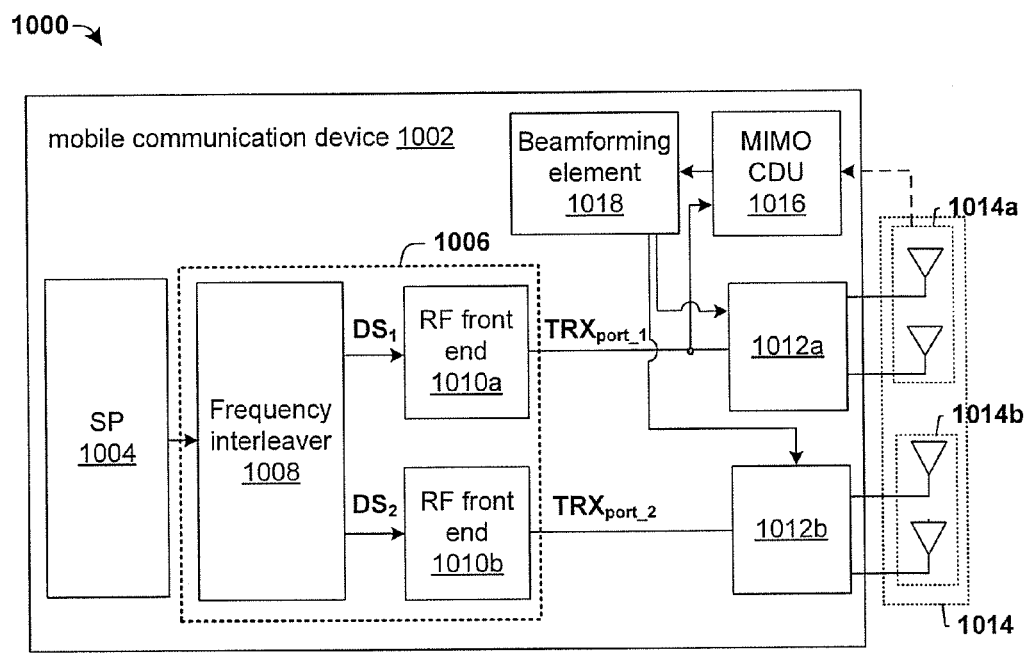
FIG. 10 illustrates some alternative embodiments of a transceiver system configured to provide wideband decoupling between antennas in a wideband MIMO setup.

FIG. 10 illustrates some embodiments of a transceiver system 1000 comprising a wideband MIMO setup (e.g., a LTE-A system) having a mobile communication device 1002. The transceiver system 1000 is described below in regards to a transmission functionality, however it will be appreciated that the transceiver system 1000 may operate to have a receiver functionality also.

The mobile communication device 1002 comprises a signal processor 1004 configured to generate data to be transmitted. The data is provided to transceiver chain 1006 comprising a frequency interleaver 1008 and a plurality of RF front ends 1010a and 1010b. The frequency interleaver 1008 is configured to separate the data to be transmitted into a plurality of separate data streams that collectively correspond to the signal-to-be-transmitted. The separate data streams are provided to separate RF front ends. For example, a first data stream $DS_1$ is provided to a first RF front end 1010a, while a second data stream $DS_2$ is provided to a second RF front end 1010b.

In various embodiments, the front ends 1010a, 1010b may comprise one or more of a power amplifier, a filter, a digital to analog converter, etc. The first front end 1010a is configured to convey the first data stream $DS_1$ between the frequency interleaver 1008 and a first adjustment network 1012a, while the second front end 1010b is configured to convey the second data stream $DS_2$ between the frequency interleaver 1008 and a second adjustment network 1012b.

The first and second adjustment networks are configured to provide the first and second data streams to separate antenna arrays within a MIMO antenna array 1014. For example, the first adjustment network 1012a is configured to operate a first directional antenna array 1014a to transmit the first data stream in a manner that provides for shallow wideband isolation between the first data stream and a second antenna port $TX_{port2}$. Similarly, the second adjustment network 1012a is configured to operate a second directional antenna array 1014b to transmit the second data stream in a manner that provides for shallow wideband isolation between the second data stream and a first antenna port $TX_{port1}$.

In some embodiments, a MIMO channel determination unit 1016 is configured to detect one or more characteristics of the first or second data stream output from the first or second MIMO antenna arrays, 1014a or 1014b, and to compare the detected characteristics to a data stream input into a respective adjustment network, 1012a or 1012b. Deviations between the output data stream and the input data stream indicate a leakage is present. In response to the leakage, the channel determination unit 1016 can generate a signal that adjusts operation of a beamforming element 1018 to decrease coupling between the first antenna port $TX_{port1}$ and the second antenna port $TX_{port2}$.

It will be appreciated that disclosed method and apparatus of wideband decoupling (e.g., between antenna ports of a MIMO antenna array) may be implemented in transceiver systems along with the disclosed method of narrow-band isolation (e.g., between a transmit antenna and a receive antenna). For example, MIMO antenna arrays comprising three or more wideband antennas can generate a radiation pattern having a first null angle at which a wideband decoupling is provided and a second null angle at which a narrow-band isolation is provided. The first null angle has a shallow suppression in the direction of the second directional antenna array. The second null angle has a deeper suppression in the direction of the receive antenna. Therefore, the three or more antennas allow for a disclosed MIMO wideband transceiver to provide for both narrow-band isolation and wideband decoupling.

Figure 11:
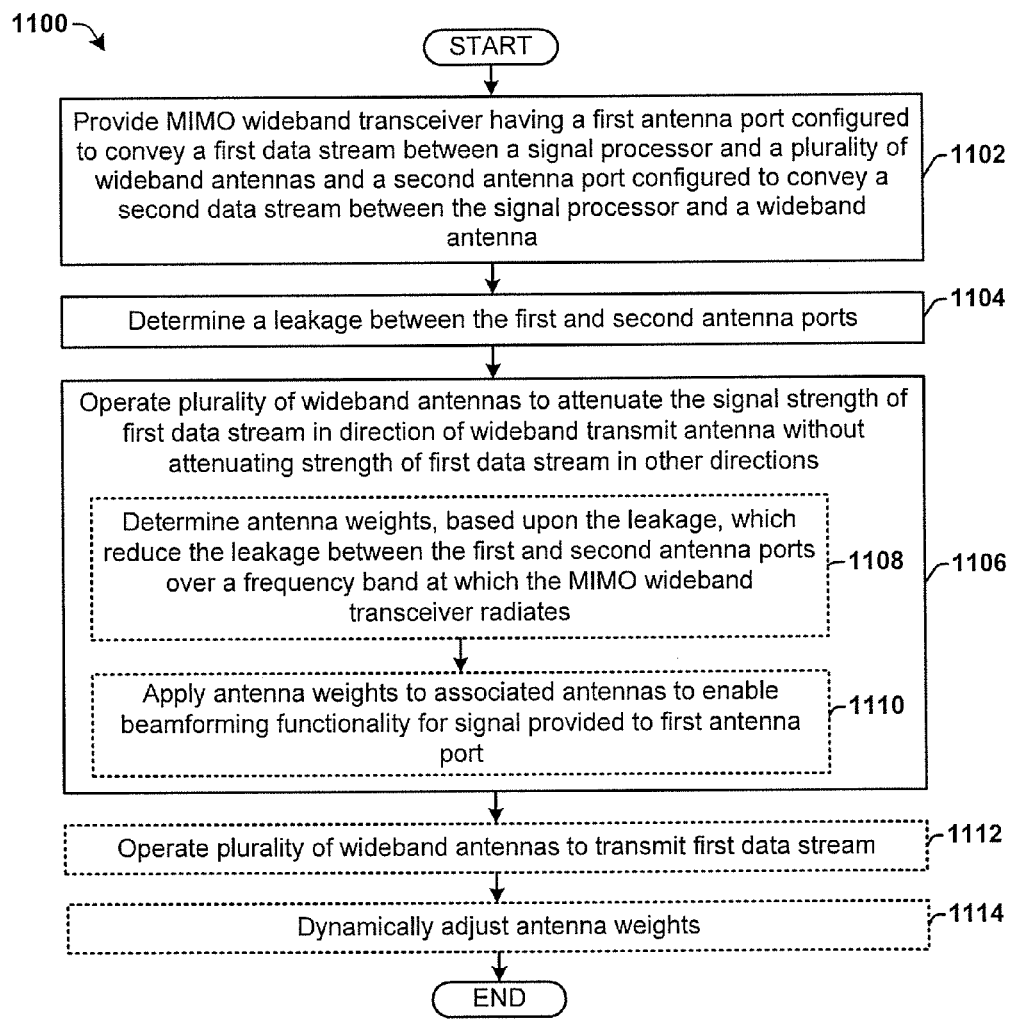
FIG. 11 illustrates a flow diagram of a method for achieving a wideband decoupling between ports of a MIMO wideband antenna array.

FIG. 11 illustrates a flow diagram of a method 1100 for achieving a wideband decoupling (i.e., isolation) between ports of a MIMO wideband antenna array.

At 1102, the method operates to provide a MIMO wideband transceiver having a wideband antenna array. The wideband transceiver comprises a first antenna port configured to convey a first data stream between a signal processor and a plurality of wideband antennas. A second antenna port is configured to convey a second data stream between the signal processor and a wideband antenna within the MIMO wideband antenna array. In some embodiments, a first data stream is provided to the first antenna port and a second data stream is provided to the second antenna port, wherein the first and second data streams collectively correspond to a signal-to-be transmitted by the MIMO antenna array.

At 1104, the method operates to determine a leakage between the first and second antenna ports. The leakage may comprise a leakage of the first data stream into a second antenna port and/or a leakage of the second data stream into a first antenna port. In some cases, the leakage is determined by measuring a transmit communication channel environment between antenna ports of the antenna array.

At 1106, the method operates the plurality of wideband transmit antennas to attenuate transmit strength of the first data stream in a direction of wideband transmit antenna without attenuating transmit strength of the first data stream in other directions. For example, in some cases (act 1108) the method determines antenna weights (e.g., phase values, capacitance or inductance values that correspond to a phase value, etc.), based upon the leakage, which reduce the amplitude of the first data stream in the direction of the wideband antenna. By reducing the amplitude of the first data stream in the direction of the wideband antenna, leakage between the first antenna port and the second antenna port is reduced over a frequency band at which the MIMO wideband transceiver radiates. The method then applies the antenna weights to associated wideband antennas to enable beamforming functionality that attenuates the leakage between antenna ports (act 1110).

At 1112, the method may operate the plurality of wideband antennas to transmit a separate data streams.

At 1114, the method operates to dynamically adjust antenna weights in response to changes in the local communication channel environment.

Figure 12:
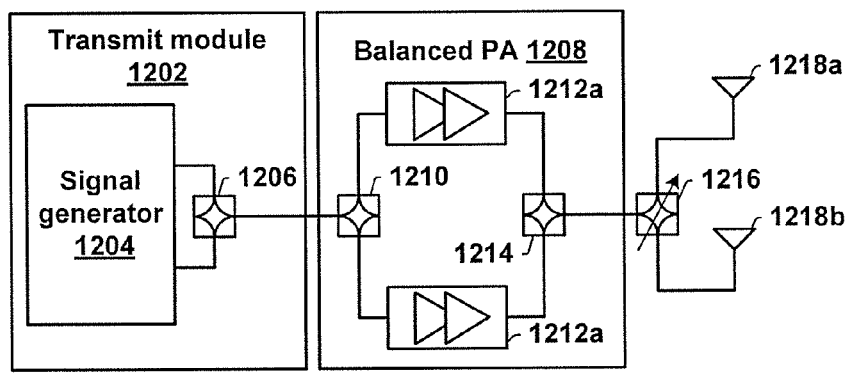
FIG. 12 illustrates an exemplary block diagram of a transmission path configured to implement analog beamforming in an array of transmit antennas.

FIG. 12 illustrates an exemplary block diagram of a transmission path 1200 configured to implement analog beamforming in an RF stage of the transmission path 1200.

Transmission path 1200 comprise a transmit module 1202 having a signal generator 1204 and a first hybrid coupler 1206 configured to provide a single ended signal to a balanced power amplifier 1208. By outputting a single ended signal, the transmit module 1202 is compatible with conventional power amplifiers which are configured to receive a single ended signal.

The balanced power amplifier 1208 utilizes a first hybrid coupler 1210 to split the received single ended signal into a differential signal, which is provided to first and second power amplifiers 1212a, 1212b. By splitting the received single ended signal into two parts, the balanced power amplifier 1208 operates more efficiently (e.g., at lower power). A second hybrid coupler 1214 receives the amplified differential signals and generates a single ended signal that is output from the balanced power amplifier 1208 to a variable hybrid coupler 1216.

The variable hybrid coupler 1216 is configured to generate a first and second output signals, having a phase shift therebetween, which are provided to first and second transmit antennas 1218 and 1218b, respectively. The phase shift between the first and second output signals enables a beamforming functionality in the signal transmitted by first and second transmit antennas 1218a and 1218b, which provides for a reduction in the amplitude of the transmitted signal in the direction of local receive antennas (i.e., receive antennas within a same transceiver system).

Figure 13:
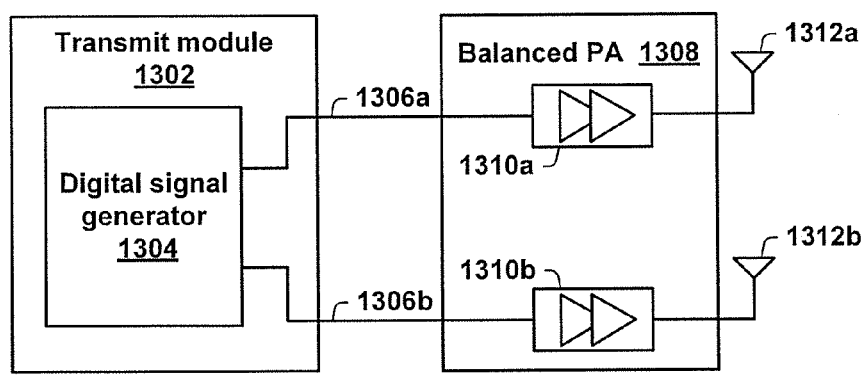
FIG. 13 illustrates an exemplary block diagram of a transmission path configured to implement digital beamforming in an array of transmit antennas.

FIG. 13 illustrates an exemplary block diagram of a transmission path 1300 configured to implement digital beamforming in a baseband stage of the transmission path 1300.

Transmission path 1300 comprises a transmit module 1302 configured to provide a differential signal to a balanced power amplifier 1308 by way of a first and second differential branches, 1306a and 1306b. The transmit module 1302 comprises a digital signal generator 1304 configured to generate differential signals having a phase shift introduced into one branch relative to the other. The phase shift can be introduced in a relatively simple manner by a register shift operation, for example.

The differential signal output from the transmit module 1302, containing signals to which digital weighting has been applied to achieve a transmitted signal having a null in the direction of a local receive antenna, are provided directly from the transmit module 1302 to separate power amplifiers 1310a and 1310b, and to first and second transmit antennas 1312a and 1312b. By using the transmit module 1302 to perform beamforming digitally, a transmitted signal having a null angle in the direction of local receive antennas (i.e., receive antennas within a same transceiver system) is generated without using a tunable balun/hybrid, resulting in a significant reduction in insertion loss and cost.

Figure 14:
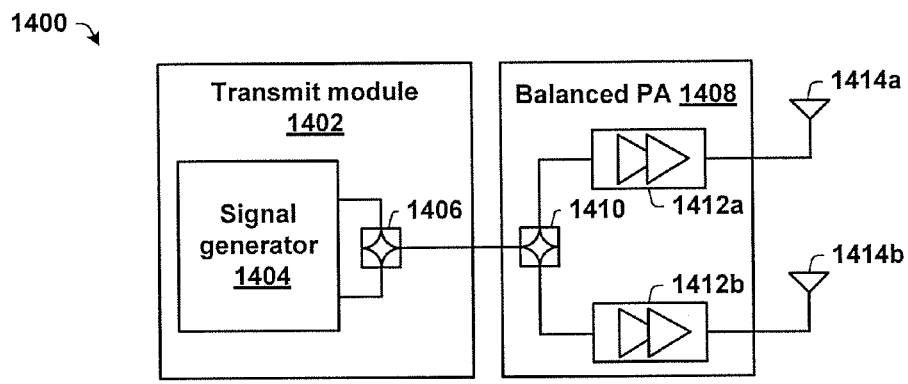
FIG. 14 illustrates an exemplary block diagram of a transmission path configured to implement analog beamforming in an array of transmit antennas.

FIG. 14 illustrates an exemplary block diagram of a transmission path 1400 configured to implement analog beamforming in a baseband stage of the transmission path 1400.

Transmission path 1400 comprises a transmit module 1402 having a signal generator 1404 configured to output a differential signal to a hybrid coupler 1406. Hybrid coupler 1406 provides a single ended signal to a balanced power amplifier 1408. By outputting a single ended signal, the transmit module 1402 is compatible with conventional power amplifiers which are configured to receive a single ended signal.

The balanced power amplifier 1408 utilizes a hybrid coupler 1410 to split the received single ended signal into a differential signal. The differential signal is provided to a first power amplifier and a second power amplifier within the balanced power amplifier 1408, and to first and second transmit antennas 1414a and 1414b.

In some embodiments, although analog devices are used in beamforming some elements of the transmission path may be controlled digitally. For example, in some embodiments the signal generator 1404 is configured to output a differential signal to which digital weighting has already been applied. Therefore, signals that are properly weighted to achieve a transmitted signal having a null in the direction of a local receive antenna are provided from the transmit module 1402 to first and second transmit antennas 1414a and 1414b.

In other embodiments, the first or second power amplifiers 1412a and 1412b are configured to selectively provide a variable phase shift, which can be used to phase shift the signal at one transmit antenna (e.g., 1414a) relative to the other (e.g., 1414b). By adjusting the relative phase shift of the transmitted signal between antennas it is possible to adjust the relative phase of the two versions of the transmitted signal. Moreover, it is possible to adjust the power level of each transmitted signal by use of independent power control of the two transmitted signals. By adjusting both phase and amplitude it is possible to achieve a transmitted signal having a null in the direction of a local receive antenna.

Figure 15:
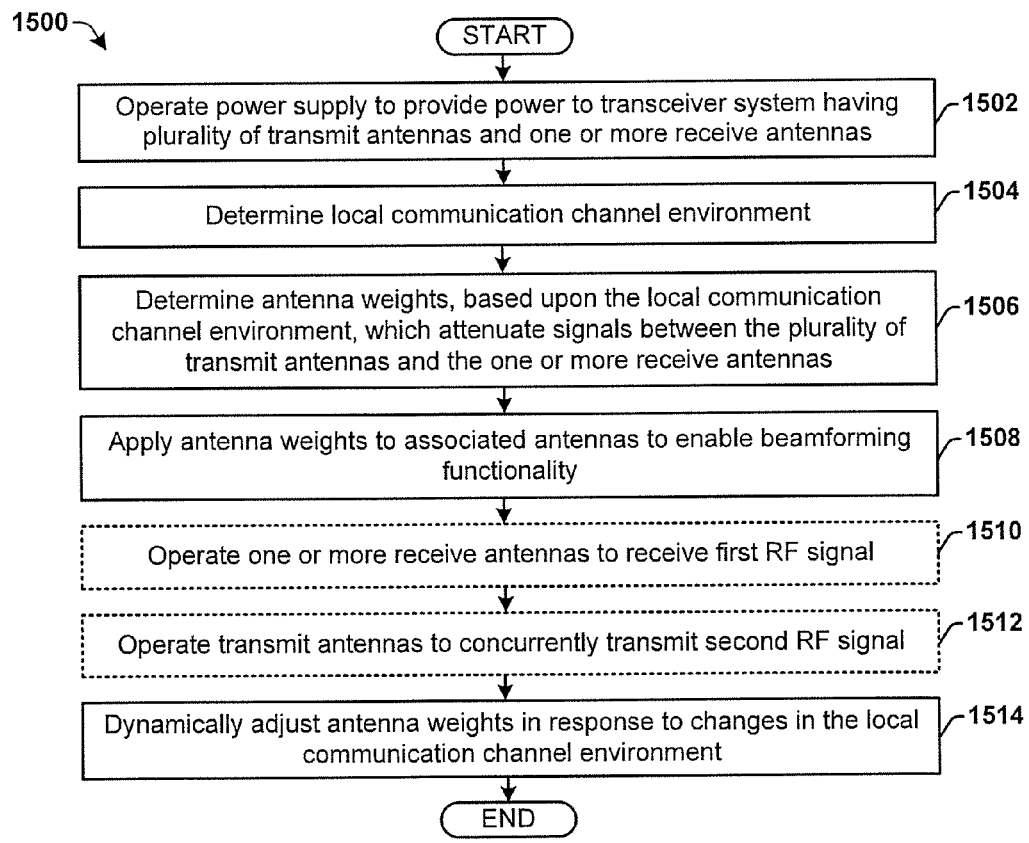
FIG. 15 is a flow diagram of an exemplary method for generating a spatial filter that provides isolation between a reception path and a transmission path.

FIG. 15 illustrates a flow diagram of a method for achieving a high degree of TX-RX isolation between a transceiver chain and a reception chain.

At 1502 the method operates a power supply to provide power to a transceiver unit having a transmission path comprising plurality of transmit antennas and a reception path comprising one or more receive antennas. In some embodiments, the number of transmit antennas is greater than the number of receive antennas.

At 1504 the method operates to determine a local communication channel environment. The local communication channel environment describes the communication channels between the plurality of transmit antennas and the one or more receive antennas.

At 1506 the method operates to determine antenna weights, based upon the local communication channel environment, which attenuate signals between the plurality of transmit antennas and the one or more receive antennas. In various embodiments, the antennas weights may comprise transmit antenna weights, which are chosen to attenuate a transmitted signal in the direction of the one or more receive antennas, or receive antenna weights, which are chosen to attenuate a received signal in the direction of the plurality of transmit antennas.

At 1508 the method operates to apply antenna weights to associated antennas to enable beamforming functionality that reduces the amplitude of signals between the plurality of transmit antennas and the one or more receive antennas. In some embodiments, receive antenna weights may be applied to the one or more receive antennas to reduce the amplitude of received signals over a null angle comprising the plurality of transmit antennas without reducing the amplitude of received signals over other angles. In some embodiments, transmit antenna weights may be applied to the plurality of transmit antennas to reduce the amplitude of the transmitted signal over a null angle comprising the one or more receive antennas without reducing the amplitude of the transmitted signal over other angles.

At 1510 the method may operates the one or more receive antennas to receive a first radio frequency (RF) signal, in some embodiments.

At 1512 the method may operate the plurality of transmit antennas to transmit a second RF signal, in some embodiments. In some embodiments, the method operates plurality of transmit antennas may transmit the second RF signal concurrent with operating the one receive antennas to receive a first RF signal.

At 1514 the method operates to dynamically adjust antenna weights in response to changes in the local communication channel environment.

Figure 16:
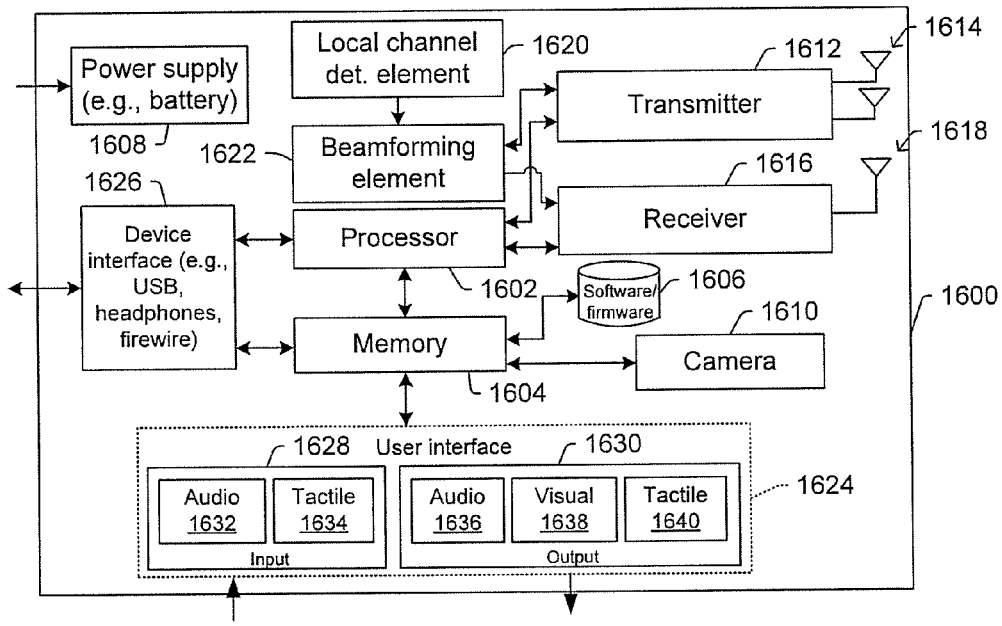
FIG. 16 illustrates an example of a mobile communication device, such as a mobile handset, in accordance with the disclosure.

FIG. 16 and the following discussion provide a brief, general description of a suitable mobile communication device 1600 to implement embodiments of one or more of the provisions set forth herein. This mobile communication device 1600 is merely one possible device on which second order intermodulation noise attenuation techniques as set forth above may be implemented, and it will be appreciated that the noise attenuation techniques may also be used with other devices (e.g., individual digital chip sets, mixed-signal chip sets, and/or analog chip sets). Therefore, the mobile communication device 1600 of FIG. 16 is only one example of a suitable operating environment and is not intended to suggest any limitation as to the scope of use or functionality of the operating environment. Example mobile communication devices include, but are not limited to, mobile devices (such as mobile phones, Personal Digital Assistants (PDAs), media players, and the like), tablets, personal computers, server computers, hand-held or laptop devices, multiprocessor systems, consumer electronics, mini computers, mainframe computers, distributed computing environments that include any of the above systems or devices, and the like.

FIG. 16 illustrates an example of a mobile communication device 1600, such as a mobile phone handset for example, configured to implement one or more embodiments provided herein. In one configuration, mobile communication device 1600 includes at least one processing unit 1602 and memory 1604. Depending on the exact configuration and type of mobile communication device, memory 1604 may be volatile (such as RAM, for example), non-volatile (such as ROM, flash memory, etc., for example) or some combination of the two. Memory 1604 may be removable and/or non-removable, and may also include, but is not limited to, magnetic storage, optical storage, and the like. In some embodiments, computer readable instructions in the form of software or firmware 1606 to implement one or more embodiments provided herein may be stored in memory 1604. Memory 1604 may also store other computer readable instructions to implement an operating system, an application program, and the like. Computer readable instructions may be loaded in memory 1604 for execution by processing unit 1602, for example. Other peripherals, such as a power supply 1608 (e.g., battery) and a camera 1610 may also be present.

Processing unit 1602 and memory 1604 work in coordinated fashion along with a transmitter 1612 and receiver 1616 to wirelessly communicates with other devices by way of a wireless communication signal. To facilitate this wireless communication, a plurality of transmit antennas 1614 are coupled to transmitter 1612, and one or more receive antennas 1618 are coupled to receiver 1616. During wireless communication, transmitter 1612 and receiver 1616 may use frequency modulation, amplitude modulation, phase modulation, and/or combinations thereof to communicate signals to another wireless device, such as a base station for example.

To provide a high degree of isolation between transmitter 1612 and receiver 1616, a local channel determination unit 1620 is configured to determine an environment of local communication channels between the transmitter 1612 and receiver 1616. In some embodiments, the local channel determination unit 1620 provides data corresponding to the environment of local communication channels to a beamforming element 1622 configured to enable beamforming functionality within the transmit antennas 1614 (e.g., by weighting the transmit antennas using analog or digital weights to introduce a phase and/or amplitude shift into the transmitted signal provided to different transmit antennas) so to attenuate the transmitted RF signal in the direction of the receive antenna(s) 1618. In other embodiments, the local channel determination unit 1620 provides data corresponding to the environment of local communication channels to a beamforming element 1622 configured to enable beamforming functionality within the receive antennas 1618 (e.g., by weighting the receive antennas using analog weights to introduce a phase and/or amplitude shift into the receives signal received at different receive antennas) so to attenuate received RF signal in the direction of the transmit antennas 1614. By attenuating transmitted and/or received RF signals between the transmit antennas 1614 and the receive antenna(s) 1618, a high degree of isolation is achieved between transmitter 1612 and receiver 1616.

To improve a user's interaction with the mobile communication device 1600, the mobile communication device 1600 may also include a number of interfaces that allow the mobile communication device 1600 to exchange information with the external environment. These interfaces may include one or more user interface(s) 1624, and one or more device interface(s) 1626, among others.

If present, user interface 1624 may include any number of user inputs 1628 that allow a user to input information into the mobile communication device 1600, and may also include any number of user outputs 1630 that allow a user to receive information from the mobile communication device 1600. In some mobile phone embodiments, the user inputs 1628 may include an audio input 1632 (e.g., a microphone) and/or a tactile input 1634 (e.g., push buttons and/or a keyboard). In some mobile phone embodiments, the user outputs 1630 may include an audio output 1636 (e.g., a speaker), a visual output 1638 (e.g., an LCD or LED screen), and/or tactile output 1640 (e.g., a vibrating buzzer), among others.

Device interface 1626 allows a device such as camera 1610 to communicate with other electronic devices. Device interface 1626 may include, but is not limited to, a modem, a Network Interface Card (NIC), an integrated network interface, a radio frequency transmitter/receiver, an infrared port, a USB connection, or other interfaces for connecting mobile communication device 1600 to other mobile communication devices. Device connection(s) 1626 may include a wired connection or a wireless connection. Device connection(s) 1626 may transmit and/or receive communication media.

Figure 17:
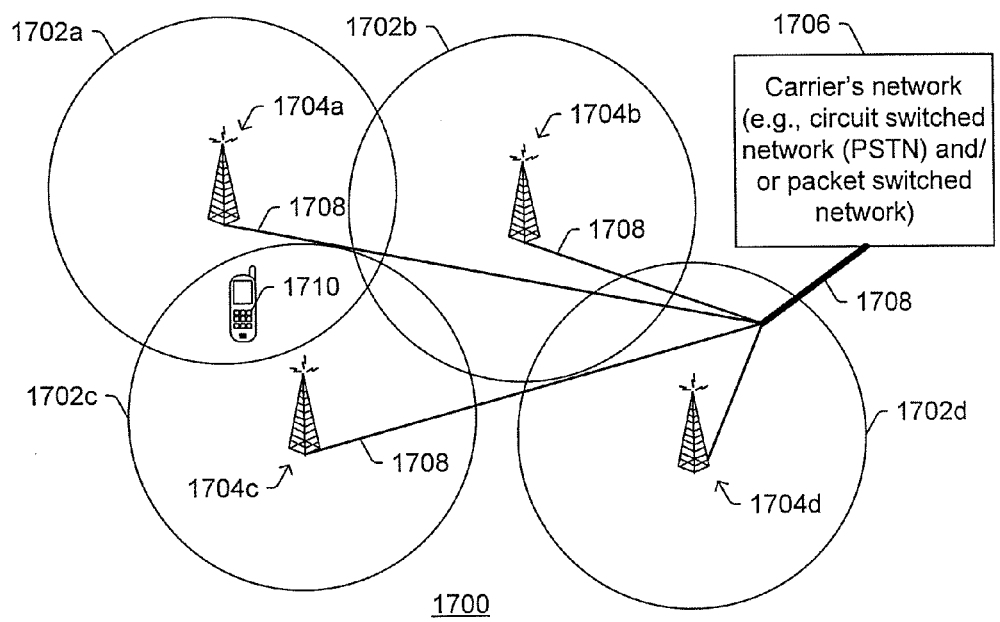
FIG. 17 illustrates an example of a wireless communication network in accordance with the disclosure.

FIG. 17 illustrates one embodiment of a wireless network 1700 over which a mobile communication device (e.g., mobile communication device 1600 in FIG. 16) in accordance with this disclosure may communicate. The wireless network 1700 is divided into a number of cells (e.g., 1702a, 1702b, . . . , 1702d), wherein each cell has one or more base stations (e.g., 1704a, 1704b, . . . , 1704d, respectively). Each base station may be coupled to a carrier's network 1706 (e.g., a packet switched network, or a circuit switched network such as the public switched telephone network (PSTN)) via one or more wirelines 1708.

A mobile device 1710 (e.g., mobile communication device 1100) or other mobile device, having a transmit antenna array configured to operate as a spatial filter that generates a null in the direction of receive antenna(s), may establish communication with the base station within that cell via one or more of frequency channels used for communication in that cell. The communication between a mobile handset or other mobile device 1710 and a corresponding base station often proceeds in accordance with an established standard communication protocol, such as LTE, GSM, CDMA or others. When a base station establishes communication with a mobile handset or other mobile device, the base station may establish communication with another external device via the carrier's network 1706, which may then route communication though the phone network.

Those skilled in the art will realize that mobile communication devices such as mobile phones may in many instances upload and download computer readable instructions from a network through the base stations. For example, a mobile handset or other mobile device 1710 accessible via network 1706 may store computer readable instructions to implement one or more embodiments provided herein. The mobile handset or other mobile device 1710 may access a network and download a part or all of the computer readable instructions for execution.

The term "computer readable media" as used herein includes computer storage media. Computer storage media includes volatile and nonvolatile, removable and non-removable media implemented in any method or technology for storage of information such as computer readable instructions or other data. Memory (e.g., 1104 in FIG. 11) is an example of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information. The term "computer readable media" may also include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A transceiver, comprising:
    a signal processor configured to output or receive a signal as a plurality of distinguishable data streams;
    a plurality of antenna ports configured to respectively convey the plurality of distinguishable data streams between the signal processor and an antenna array having a plurality of wideband antennas configured to wirelessly transmit or receive the plurality of distinguishable data streams;

wherein the pluraity of antenna ports comprise:
  a first antenna port configured to convey a first data stream between the signal processor and a first wideband antenna and a second wideband antenna; and
  a second antenna port configured to convey a second data stream between the signal processor and a third wideband antenna; and
  a spatial filter element configured to provide isolation between the plurality of antenna ports by operating one or more of the plurality of wideband antennas to perform beamforming that attenuates a wirelessly transmitted or received data stream in a direction of other wideband antennas within the antenna array.

2. The transceiver of claim 1, wherein the spatial filter is configured to provide isolation between the plurality of antenna ports of approximately 10-20 dB over the requency range, which spans approximately 50-200 MHz.

3. The transceiver of claim 1, wherein the spatial filter comprises:
  an adjustment network configured to provide a phase shift or an amplitude shift into the first data stream so that the first wideband antenna receives a first phase shifted version of the first data stream.

4. The transceiver of claim 3, wherein the spatial filter further comprises:
  a MIMO channel determination unit configured to determine data corresponding to leakage between the first and second antenna ports; and
  a beamforming element configured to receive the data from the MIMO channel determination unit and based thereupon to operate the adjustment network to assign values to the phase shift or amplitude shift that attenuate the first data stream in the direction of the third wideband antenna without attenuating the first data stream in other directions.

5. The transceiver of claim 4, wherein the adjustment network comprises a plurality of lossless components configured to introduce the phase shift or amplitude shift into the first data stream.

6. The transceiver of claim 5, wherein the adjustment network comprises:
  a splitter configured to receive the first data stream and to output the first data stream to a first data path connected to the first wideband antenna and a second data path connected to the second wideband antenna;
  a first phase shifter located within the first data path and configured to introduce a first phase shift that results in a first phase shifted version of the first data stream; and
  a second phase shifter located within the second data path and configured to introduce a second phase shift that results in a second phase shifted version of the first data stream.

7. The transceiver of claim 4, wherein the beamforming element is configured to dynamically vary the antenna weights until a maximum or average leakage between the first and second antenna ports is minimized over a frequency at which the first and second wideband antennas radiate.

8. The transceiver of claim 4, wherein the beamforming element is configured to utilize an iterative algorithm that varies the antenna weights until a maximum or average leakage between the first and second antenna ports is minimized over a frequency at which the first and second wideband antennas radiate.

9. The transceiver of claim 1, further comprising:
  a frequency interleaver positioned between the signal processor and the adjustment network and configured to separate a signal-to-be-transmitted into a plurality of separate data streams that collectively correspond to the signal-to-be transmitted, wherein respective data streams are transmitted by separate wideband antennas within the MIMO antenna array.

10. A mobile communication device, comprising:
  a transmitter or receiver path comprising:
  a first antenna port connected to two or more wideband antennas, configured to transmit or receive a first data stream, by way of a first adjustment network comprising circuit elements configured to introduce a phase shift or amplitude shift into the first data stream;
  a second antenna port connected to a wideband antenna configured to transmit or receive a second data stream;
  a MIMO channel determination unit configured to determine data corresponding to a leakage between the first antenna port and the second antenna port; and
  a beamforming element configured to receive the data from the MIMO channel determination unit and based thereupon to adjust the values of the circuit elements within the first adjustment network, so as to enable a beamforming functionality that reduces leakage of the first data stream to the second antenna port.

11. The mobile communication device of claim 10, wherein the beamforming element is configured to provide isolation between the first antenna port and the second antenna port of approximately 10-20 dB over a frequency range spanning approximately 50-200 MHz.

12. The mobile communication device of claim 10, wherein the first adjustment network comprises a plurality capacitors or inductors configured to introduce the phase shift or the amplitude shift into the first data stream.

13. The mobile communication device of claim 10, wherein the first adjustment network comprises:
  a splitter configured to receive the first data stream and to output the first data stream to a first data path connected to the first wideband antenna and a second data path connected to the second wideband antenna;
  a first phase shifter located within the first data path and configured to introduce a first phase shift that results in a first phase shifted version of the first data stream; and
  a second phase shifter located within the second data path and configured to introduce a second phase shift that results in a second phase shifted version of the first data stream.

14. The mobile communication device of claim 10, further comprising:
  a second adjustment network comprising circuit elements configured to introduce a phase shift or an amplitude shift into the second data stream, wherein the phase shift has a value that enables a beamforming functionality that reduces leakage of the second data stream to the first antenna port.

15. The mobile communication device of claim 10,
  wherein the first antenna port is connected to three or more wideband transmit antennas;
  wherein the beamforming element is configured to operate the three or more wideband transmit antennas to generate a first isolation angle in the direction of the second directional antenna array and a second isolation angle in the direction of a receive antenna array; and
  wherein the first isolation angle has a lower magnitude of isolation than the second isolation angle.

16. A method for reducing leakage between antenna ports of a MIMO wideband antenna array, comprising:
  providing a MIMO transceiver having first antenna port configured to convey a first data stream between a signal processor and a plurality of wideband antennas within an antenna array and a second antenna port configured to convey a second data stream between a signal processor and a wideband antenna within the antenna array;

determining a leakage of the first data stream into the second antenna port; and operating the plurality of wideband antennas in a manner that reduces the leakage by attenuating an amplitude of a wirelessly transmitted first data stream in the direction of the wideband antenna.

17. The method of claim 16, wherein operating the plurality of wideband antennas, comprises:

determining antenna weights, based upon the leakage, which reduce the amplitude of the wirelessly transmitted first data stream in the direction of the wideband antenna; and applying the antenna weights to the plurality of wideband antennas to enable the beamforming functionality.

18. The method of claim 16, wherein the signal strength of the first data stream is attenuated by approximately 10-20 dB over a frequency range spanning of approximately 50-200 MHz.

19. The method of claim 16, further comprising:

dynamically adjusting the antenna weights in response to changes in the leakage.

* * * * *

UNITED STATES PATENT AND TRADEMARK OFFICE
CERTIFICATE OF CORRECTION

PATENT NO. : 8,805,300 B2  Page 1 of 1
APPLICATION NO. : 13/598683
DATED : August 12, 2014
INVENTOR(S) : Osama Nafeth Alrabadi et al.

It is certified that error appears in the above-identified patent and that said Letters Patent is hereby corrected as shown below:

In the Claims

Column 21, Claim 2, Line 16 Please replace "requency" with --frequency--
Column 21, Claim 6, Line 40 Please replace "claim 5" with --claim 4--

Signed and Sealed this
Twenty-fifth Day of November, 2014

Michelle K. Lee
*Deputy Director of the United States Patent and Trademark Office*